(12) United States Patent
Milner et al.

(10) Patent No.: US 6,339,410 B1
(45) Date of Patent: Jan. 15, 2002

(54) APPARATUS AND METHOD FOR LANGUAGE TRANSLATION BETWEEN PATIENT AND CAREGIVER, AND FOR COMMUNICATION WITH SPEECH DEFICIENT PATIENTS

(75) Inventors: John A. Milner, Lynwood; Addis E. Mayfield; Lawrence E. Mayfield, both of Kent, all of WA (US)

(73) Assignee: Tellassist, Inc., Kent, WA (US)

( * ) Notice: Subject to any disclaimer, the term of this patent is extended or adjusted under 35 U.S.C. 154(b) by 0 days.

(21) Appl. No.: 09/121,277

(22) Filed: Jul. 22, 1998

Related U.S. Application Data

(60) Provisional application No. 60/053,434, filed on Jul. 22, 1997.

(51) Int. Cl.[7] .............................. G09G 5/00; G06K 9/00; A61B 5/00
(52) U.S. Cl. ............................ 345/1; 382/128; 600/300
(58) Field of Search ................................ 345/1–2, 173, 345/349; 382/128; 600/300

(56) References Cited

U.S. PATENT DOCUMENTS

| | | | |
|---|---|---|---|
| 3,651,512 A | 3/1972 | Summers | 340/325 |
| 3,925,779 A | 12/1975 | Gerstenhaber | 340/337 |
| 4,165,890 A | 8/1979 | Leff | 283/7 |
| 4,241,521 A | 12/1980 | Dufresne | 434/112 |
| 4,333,092 A | 6/1982 | Field | 340/378.2 |
| 4,408,192 A | 10/1983 | Ward et al. | 340/407 |
| 4,761,633 A | 8/1988 | Leff et al. | 340/286 R |
| 4,795,348 A | 1/1989 | Garthwaite | 434/112 |
| 4,954,083 A | 9/1990 | Leff et al. | 434/112 |
| 4,969,096 A | 11/1990 | Rosen et al. | 364/413.02 |
| 5,101,476 A | 3/1992 | Kukla | 395/200 |
| 5,146,562 A | 9/1992 | Kukla | 395/200 |
| 5,169,342 A | 12/1992 | Steele et al. | 434/112 |
| 5,207,580 A | 5/1993 | Strecher | 434/238 |
| 5,233,333 A | 8/1993 | Borsuk | 340/731 |
| 5,252,075 A | 10/1993 | Heng | 434/112 |
| 5,260,869 A | 11/1993 | Ferrier et al. | 364/413.01 |
| 5,341,291 A | 8/1994 | Roizen et al. | 364/413.02 |

(List continued on next page.)

FOREIGN PATENT DOCUMENTS

| | | |
|---|---|---|
| JP | 408126617 A | 5/1996 |
| JP | 410043145 A | 2/1998 |

*Primary Examiner*—Richard Hjerpe
*Assistant Examiner*—Duc Q Dinh
(74) *Attorney, Agent, or Firm*—R. Reams Goodloe, Jr.

(57) ABSTRACT

An apparatus and method for communication between patients and caregivers who speak different languages, or with speech deficient persons. A touch sensitive screen is provided to allow a patient to select responses to questions posed by care givers. A simple graphical user interface is provided which assists patients on respirators or otherwise unable to speak to communicate with hospital staff and family members. Combining thin profile LCD monitors with touch screen technology provides the user interface. In a preferred embodiment, a battery powered portable general purpose computer features a patient monitor on an adjustable articulated arm, and a second monitor for the care giver to view the patient's inputs and responses. Ideally, a roll-around hardware mounting configuration, with battery pack power, allows the system to be quickly moved and used in virtually any location. The software features a large vocabulary of typical words and phrases which are grouped into sets which can be selected for display. Also, an image of the human body can be used to identify the location of pain. Word buttons can be replaced with pictures to assist children who cannot read. Additionally, words and phrases can be selected from by language pairs, such as English-English, English-Spanish, so that the common phrases assist in two way communication between patients and staff of differing languages.

27 Claims, 25 Drawing Sheets

U.S. PATENT DOCUMENTS

| | | |
|---|---|---|
| 5,404,292 A | 4/1995 | Hendrickson .......... 364/413.02 |
| 5,441,047 A | 8/1995 | David et al. ................. 128/670 |
| 5,561,446 A | 10/1996 | Montlick .................... 345/173 |
| 5,580,254 A | 12/1996 | Ramsey ...................... 434/236 |
| 5,601,435 A | 2/1997 | Quy ....................... 434/307 R |
| 5,626,151 A | 5/1997 | Linden ....................... 128/897 |
| 5,633,621 A | 5/1997 | McDonald ............. 340/286.01 |
| 5,642,731 A | 7/1997 | Kehr ........................... 128/630 |
| 5,720,502 A * | 2/1998 | Cain ........................... 283/115 |
| 5,742,779 A | 4/1998 | Steele et al. ................. 345/349 |
| 5,778,882 A | 7/1998 | Raymond et al. ............ 128/700 |
| 5,788,851 A | 8/1998 | Kenley et al. ............... 210/739 |
| 5,854,997 A * | 11/1998 | Sukeda et al. ................. 704/3 |
| 5,970,980 A * | 10/1999 | Adair .......................... 128/849 |

\* cited by examiner

APPARATUS AND METHOD FOR LANGUAGE TRANSLATION BETWEEN PATIENT AND CAREGIVER, AND FOR COMMUNICATION WITH SPEECH DEFICIENT PATIENTS

This application claims benefit to U.S. provisional application 60/053,434 filed Jul. 22, 1997.

TECHNICAL FIELD

This invention is related to an apparatus and method for language translation between patients and caregivers, and for communicating, without speech, with persons such as hospital patients on ventilators, or other persons experiencing difficulty in communication.

BACKGROUND

Many attempts have been made over the years to provide improved methods and apparatus for facilitating communication between patients who do not speak the language of the caregiver, or who are not capable of speech. Hospital staff, doctors, and even family members visiting are often frustrated at the difficulty of communicating with patients on ventilators, or who are otherwise speech impaired. Unfortunately, such previous methods known to us have been relatively simplistic, or seem rather puzzling to the infirm or the usually somewhat mentally and/or physically incapacitated patients. As a result, there remains a significant and unmet need for an improved method and device for communication with such patients. Typical candidate patients would be those on respirators or mechanical ventilators who are unable to speak due to obstruction of their airway due to such breathing devices. Such patients are often in intensive or critical care situations with life threatening illnesses. The proper treatment of many such injuries require, or recovery could benefit from, close monitoring and rapid, accurate response to changes in the patient's condition. However, without effective direct communication with the patient, information about that patient's condition is often missing or incomplete, which creates the potential for incomplete or inaccurate diagnoses and treatment scenarios. Similarly, when doctors and caregivers do not have multiple language capability, and cannot speak to the patient in their own language, communication is difficult or impossible.

Additionally, patients on respirators are frustrated by not being able to ask about their condition. One important and significant problem is their inability to communicate with staff to advise of the location and intensity of pain. Patients are also often frustrated with their inability to communicate with family members about personal matters. That frustration generally compounds the patient's anxiety, stress, and fear at being in a life threatening situation, and can often result in the need for restraints or increased medication, all of which increases the patient's overall risk of a prolonged recovery or adverse outcome.

It is also known that the ability to effectively communicate has a considerable helpful effect on the patient's state of mental health, as well. Patients who are already distressed by their physical condition are often further depressed by the isolation that they feel when they are not able to articulate even their most basic needs to their caregivers. Since a positive mental attitude is often essential in recovering from severe physical trauma, improved communication could directly translate into a higher level of alertness, more responsiveness, and an improved mental state. In short, a better apparatus and method for communication could result in more effective patient care, improved patient comfort, an improved patient mental state, and could be expected to speed up the time for recovery. Sometimes, it may even make the difference between life and death.

Existing methods of communicating with such patients are primitive at best. Methods often used consist of reading lips, pointing to charts of letters and pictures, or attempts at written messages. Care givers and family members alike resort to a kind of guessing game of "twenty questions" when attempting to carry on both sides of a conversation, by constructing a series of questions which have only yes or no answers until they eventually focus with some degree of certainty on what the patient wanted. Sometimes, one party, such as the family member or the patient, simply gives up the attempt to communicate, from fatigue and/or frustration. Moreover, reading lips requires training, and assumes the staff knows the language that the patient is mouthing. Importantly, such practices are impossible if there is an obstruction in the patients mouth, such as when using a ventilator, or when a significant impairs use of the mouth. Also, using a chart of letters and/or a screen of pictures is very time consuming and tiring to the patient, and requires a fairly high level of patient alertness. Written messages, while reasonably effective, can only be accomplished by a low percentage of patients who have a high level of alertness, function, and manual dexterity. All of these approaches are slow, and prone to errors and misunderstandings. At best, such prior art methods are only partially effective in the best of circumstances, and are totally ineffective for many patients, particularly for very small children and for patients who speak a foreign language.

Frequently, patients with the greatest need to communicate are the least physically able to respond. It is not unusual for patients to experience periods where only slight head or finger movements are possible. Such limitations virtually eliminate any communication which is not assisted by some technological device. The very fact that a patient is in a physical condition that requires breathing assistance generally is indicative that any prolonged physical effort to communicate would represent an extraordinary effort for that patient.

Importantly, the patient's need for assistance with communication does not end upon being released from the Intensive Care Unit or Cardiac Care Unit (ICU/CCU) environment. Patients surviving the initial trauma of severe injury, illness, or surgery, are moved out of the critical care facility as soon as possible to free that bed for the next critical care patient. After leaving the care unit, patients may require continued support on a mechanical ventilator for an extended time period before recovering sufficiently to breath without assistance. In some cases, patients may be moved to other hospital beds, or be cared for in a nursing home or in an out-patient situation in a personal residence for weeks or months, possibly indefinitely.

Patients requiring long term care have a great and as yet still unmet need for an effective communication system, since they are often more alert and better able to function than those in intensive care, but are still unable to speak to staff or family members. Failed attempts to effectively communicate leads to additional frustration, anxiety and stress for such patients.

SUMMARY

We have now invented, and disclose herein, a computer program based communication system, and have designed an apparatus which is effective in implementing that system.

The system reliably and effectively assists patients on respirators or who are otherwise unable to speak or to communicate with hospital staff or with family members, by providing a straightforward, simple and understandable graphical user interface (GUI). Preferably, the interface is interactively accessed by the patient with the use of a touch sensitive display screen. Alternately, other input devices can be utilized, such as keyboards, a head mouse, a track ball, or other input device. Utilizing currently available thin profile monitors in combination with touch screen technology provides a simple user interface.

A key design objective, namely that the system be intuitively simple to operate so that impaired patients with no special training or prior computer experience can utilize the system to communicate effectively, has clearly been achieved. In a preferred embodiment, our apparatus features a patient monitor located on an adjustable articulated arm. A second monitor is provided, preferably on a mobile stand, to allow a caregiver or family member to view the patient's inputs and responses. Ideally, a self contained, completely independent, roll-around hardware configuration is provided, utilizing a battery pack for long term power supply to the supporting general purpose computer. Such a preferred arrangement allows our patient communication system to be quickly moved and to be used in virtually any location. The software program provided features a large vocabulary of typical words and phrases useful in patient care, which words and phrases are grouped into sets that can be selected, usually by the patient (but also by the caregiver) for display. Also available for display are images of the human body, both male and female (both front and rear), that can be used by a patient to identify the exact location of pain or other problem they may be experiencing. Where appropriate, words appearing on graphical screen images can be replaced with pictures to assist those who cannot read, such as children. In yet another enhancement, the common phrases and word lists, further explained below, are provided in various languages, which can be selectively coupled in two-language sets, to assist in effecting two way communication between patients and staff who understand only a differing language from the patient. In the United States, for example, one common language pair which is of particular benefit is Spanish-English, where questions and answers can be posed in either language.

OBJECTIVES AND NOVEL FEATURES

Our novel method and apparatus has addressed many design requirements, and has effectively met objectives to provide various novel features, in order to provide an effective solution to the special communications needs of patients, particularly those on respirators.

One design objective of our development is simplicity of the method and apparatus. This is important since patients are often elderly and not infrequently may be intimidated by computers. Thus control must be intuitive and require essentially no training or previous experience. It is a feature of the present invention that patient communication is facilitated while avoiding the necessity for patient operation of complex or difficult to manipulate equipment.

Another objective of our invention is to provide easy to use input devices. This is important since patients are frequently severely impaired, and are often found with very limited dexterity and mobility. It is a feature of our invention that the input devices provided are easy to use with little or no training. It is another feature that the method and device is adaptable for use throughout a range of input devices suitable for patients with a range of impairments.

Another objective of our invention is good visibility to the patient. This is important since many patients have poor or impaired visibility. It is yet another feature of our invention that the graphical objects on the patient's viewing LCD screen are generally provided in large blocks that can be easily seen. Thus, our invention can be utilized by patients with poor visibility.

It is another objective of our invention that the output responses be easily understood by the staff or family. It is a feature of our invention that the responses are visible to staff and family, via separate monitor, although the patient monitor may be facing directly away from the staff, toward the patient. It is yet another important feature of our invention that both audible and visual feedback to indicate patient responses may be provided.

It is another objective of our invention that the output responses be easily communicated between speakers of differing languages. It is a feature of our invention that the responses are provided with the ability to match language pairs, so that any desirable language pair may be communicated using common words and phrases to describe the condition of the patient. It is a feature of our invention that communication between individuals of differing languages is achieved.

It is still another objective of our invention that the needs of children or others who have difficulty with words be able to communicate. One feature of our invention is the presentation of images which portray a question, answer, or response that enables communication without words. This is important since some children do not read at all.

Yet another design objective is flexibility of location and placement. It is an important feature of our invention that the patient monitor is adjustable to any location with the reasonable reach of the patient. In this manner, our novel method and apparatus may be used by patients who are lying down, who are reclined, who are sitting up in bed, or who are in wheelchairs. It is an important feature that the patient monitor provided is adjustable to a wide variety of viewing angles. Also, it is another important feature that the patient monitor be adjustable with a minimum of effort through a wide range of heights, ranging from about 30 inches to about 60 inches. Finally, it is an important feature that the patient monitor is manually adjustable, vertically, horizontally in both axes, and in tilt.

Another important and useful objective is portability. One important feature of our invention is that the apparatus is preferably provided in a portable, battery powered configuration, where the portable wheeled stand can be easily rolled between patients or rooms. This is important in locales where limited funding resources may limit the purchase of such communication devices to a minimum number, which can be shared between patients, such as when patients are sleeping.

Another design objective is structural stability, i.e., good weight and balance design. This is important since it is preferable that the patient monitor be relatively light in weight, so it can be positioned above a patient on an articulated arm, without fear of the unit injuring the patient by inadvertent downward motion. Also, it is a feature that our apparatus is designed with a relatively low center of gravity, so that it is not prone to tipping over to potentially cause further harm to the patient, or injure the caregiver, or to damage the equipment.

Still another important objective is that the unit be easily disinfected. It is an important feature of our invention that the patient touch screen, as well as other parts, are made from easily cleanable materials which can be disinfected with common hospital cleaning solutions. Moreover, it is still another feature that key electronic components are completely sealed, so as to be resistant or impervious to spill of liquids, whether contaminated or not.

Yet another objective is that the risk of electrical shock be minimized or eliminated to the maximum extent feasible. It is a feature of our battery powered unit that this objective is easily achieved, in the preferred embodiment. If is still another feature, in furtherance of this objective, that our novel apparatus provides an electrical current leakage limited to conventional specifications for hospital equipment, and is compliant with both UL and FCC specifications applicable to its use.

DETAILED DESCRIPTION

Figure 1:
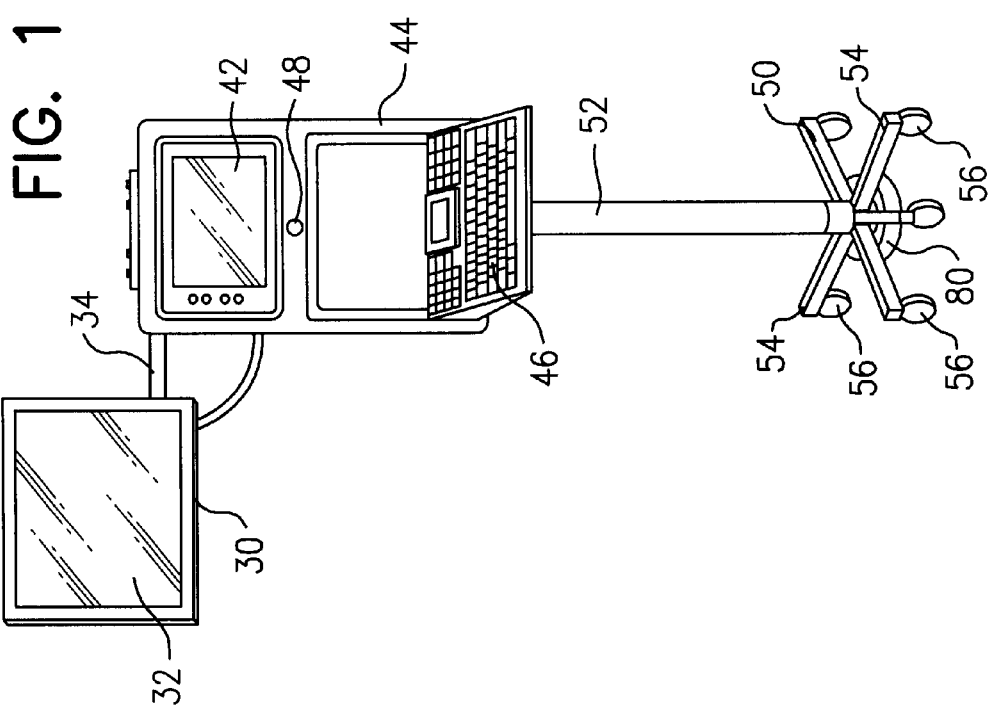
FIG. 1 is a perspective view of the apparatus used for implementing our system of communication with a patient, showing a relocatable mounting stand on rollers, a general purpose computer with screen and a storable keyboard in the unstowed, open position, and a patient screen on an articulating arm.
Figure 3:
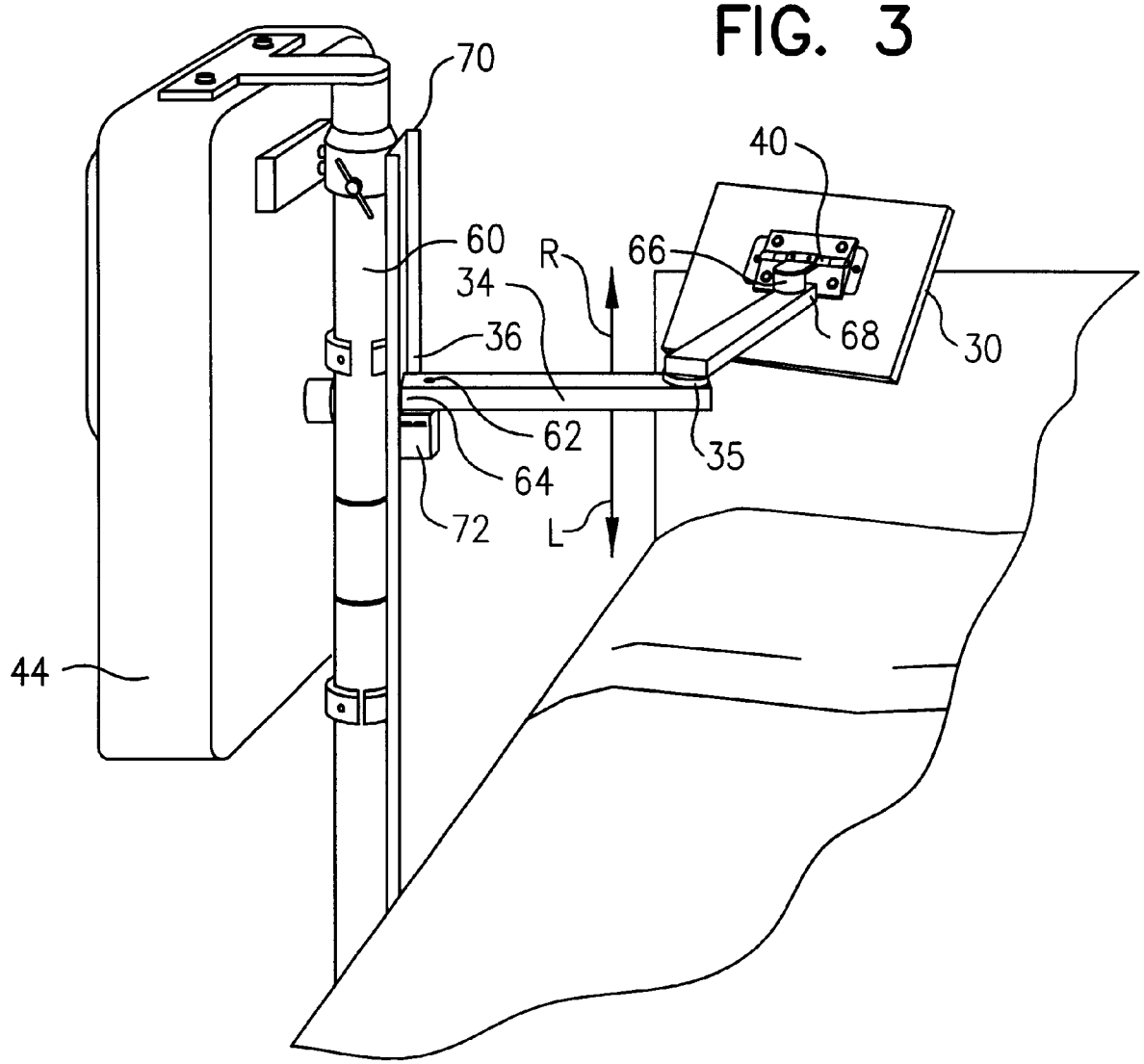
FIG. 3 is yet another perspective view of the apparatus used for implementing our system of communication with a patient, showing in detail the upright standard on the relocatable mounting stand, the mounting of the general purpose computer to the stand, and the mounting of the LCD patient screen on an articulating arm with interconnecting cable to the general purpose computer.
Figure 4:
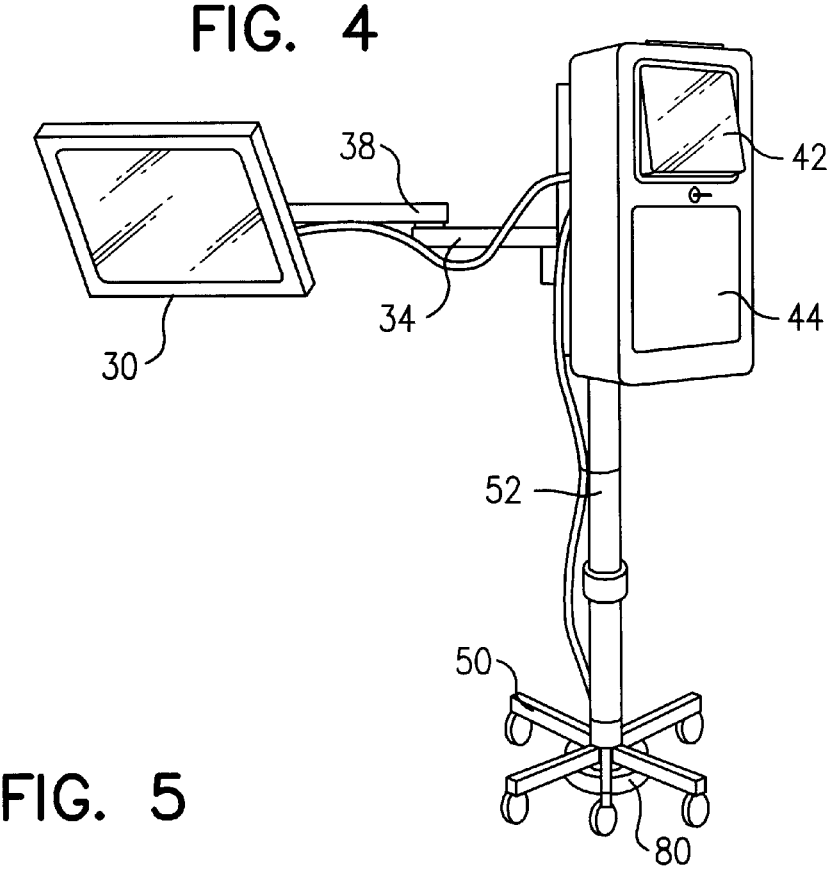
FIG. 4 is still another view of the apparatus used for implementing our method of communicating with a speech deficient person, showing the articulating arm used for mounting the LCD patient screen, and that screen with a touch display ready for interaction with a patient.
Figure 5:
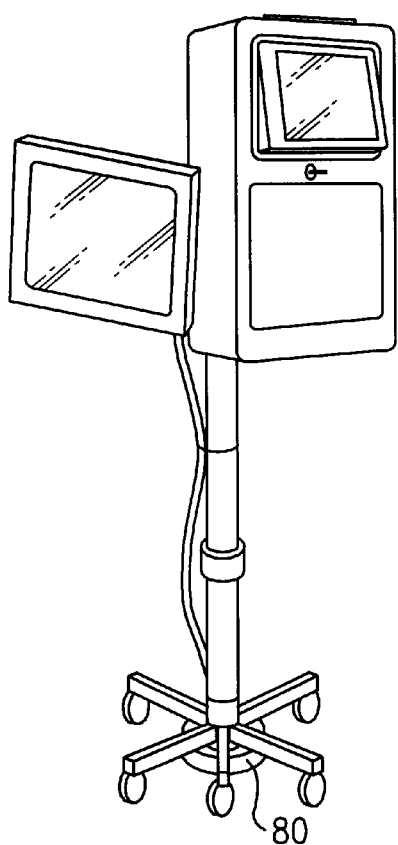
FIG. 5 is similar to the view first shown in FIG. 4, now showing the articulating arm of the patient LCD screen in the stowed position, next to the upright standard.
Figure 6:
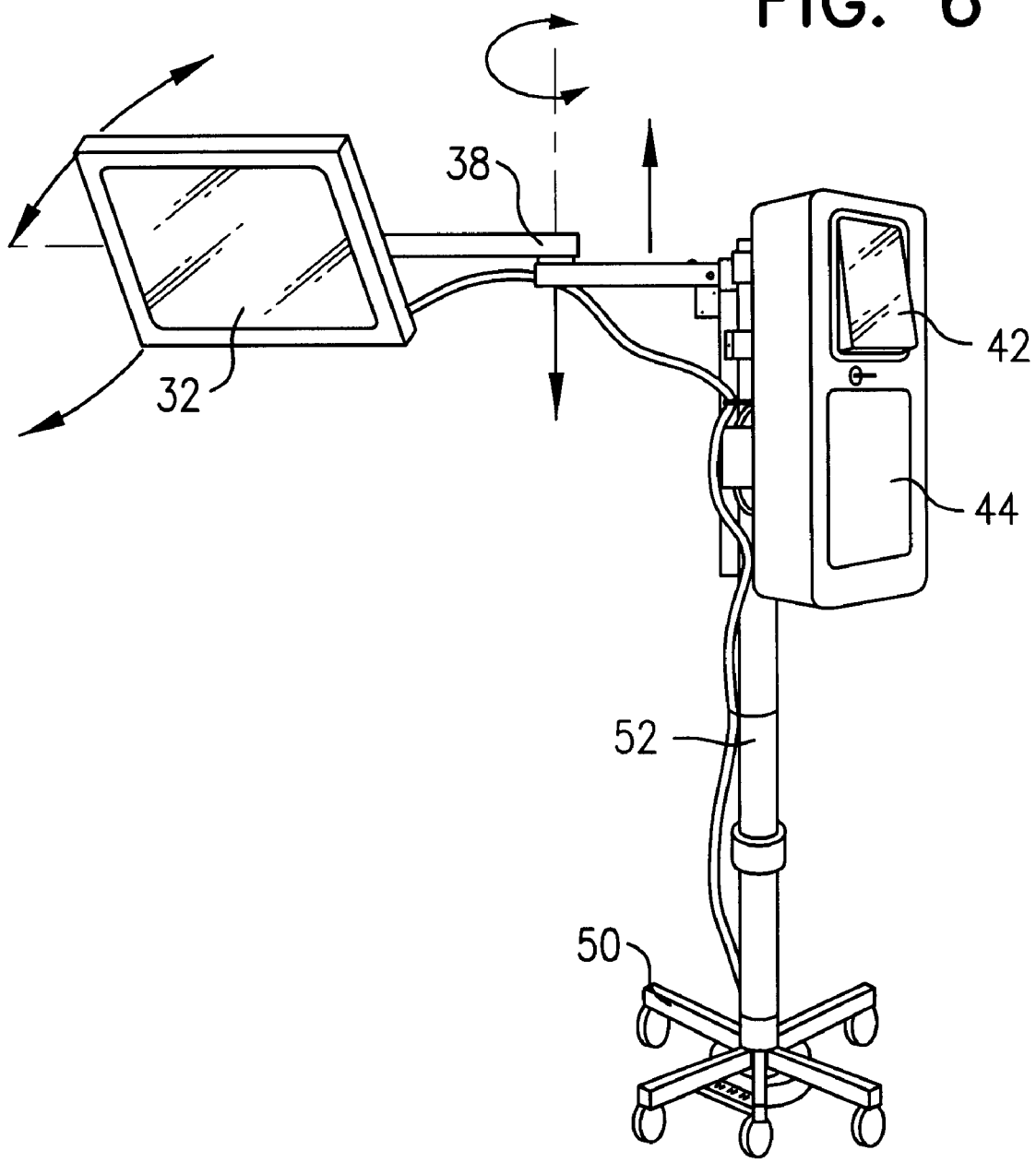
FIG. 6 is yet another view of the apparatus used for implementing our method of communication with a speech deficient person, showing the articulating arm for the patient's LCD screen in the fully extended position, with the screen locate at the upper end of the upright support standard on the mobile, repositionable stand.
Figure 27:
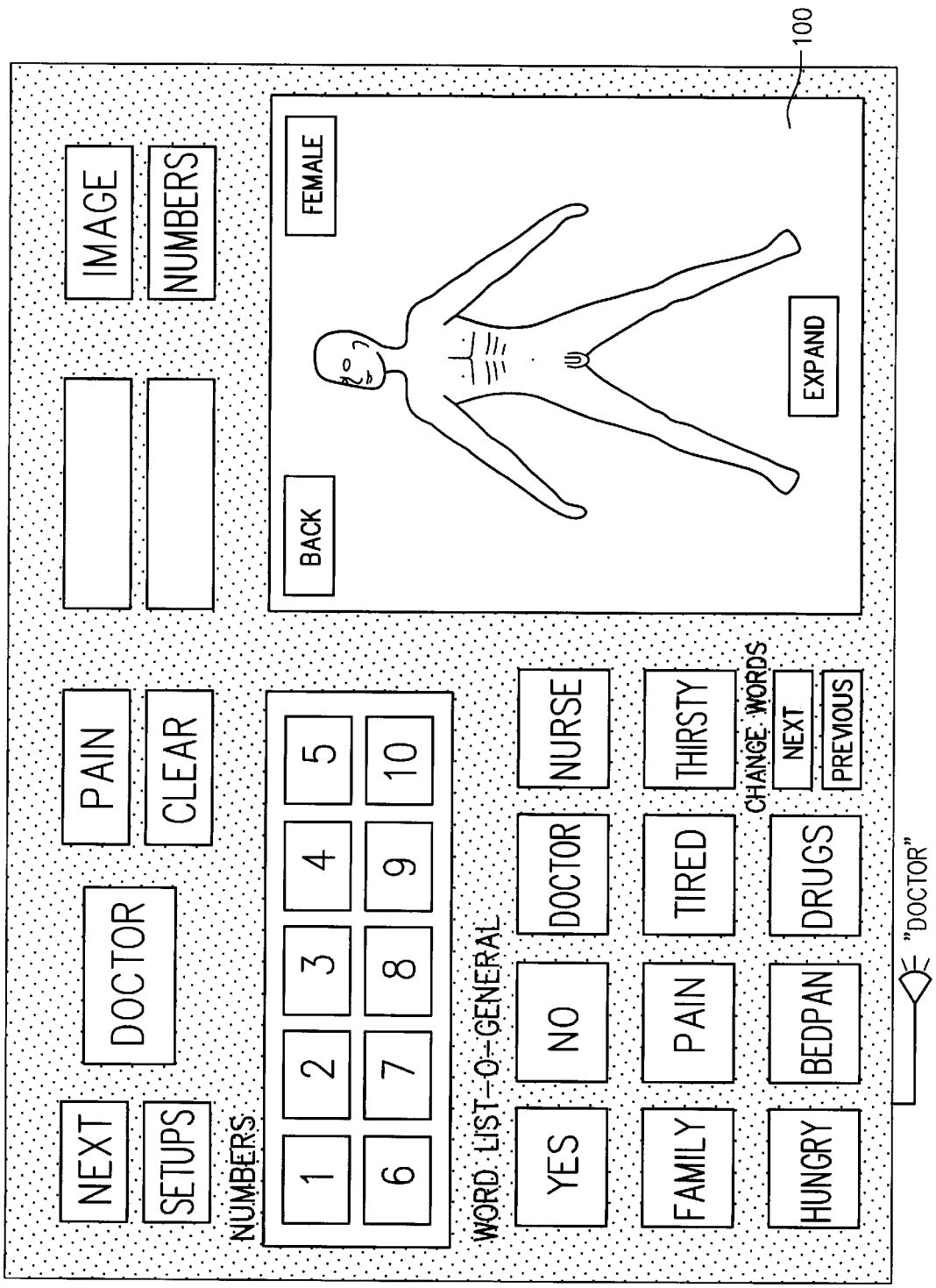
FIG. 27 shows another embodiment of the invention, where an image of a human body is provided, and where the a first word list out of a pre-selected number of word lists is shown, and also indicating the use of sound in the system in that the word "doctor" was selected, and is broadcast from the speaker on the system.

As seen in FIG. 1, the preferred apparatus for implementing our method of communication with a speech deficient person features a thin profile LCD (liquid crystal display) monitor 30 with an integral resistive touch display screen 32 as the primary interface to the patient. As seen in FIG. 3, the patient monitor 30 is mounted on an articulated arm 34 with both vertical 36 and horizontal 38 position, as well as tilt 40 adjustments. Referring again to FIG. 1, feedback to the staff is achieved through a display screen, preferably LCD type monitor 42, which faces away from the patient. A synthesized voice output provides feedback to the patient and the care giver, so that patient responses can be both seen and heard, as further noted in FIG. 27. That way, each answer selected also has a voice component.

The host computer system 44 is a small general purpose multimedia personal computer, preferably (PC) packaged along with a small keyboard 46 in a lockable 48 NEMA rated enclosure which can be closed hiding the keyboard (compare FIGS. 1 and 2 ), and protecting both components and interface cabling from accidental spills. The computer 44 and display screen 32 are interconnected by cable 47, which alternately may be achieved by running the cable 47 in the articulating arm 34. Both LCD monitors 32 and 42 are also NEMA rated and sealed against accidental spills which allows the screens to be cleaned with disinfectants between each use to protect the patients and staff from the spread of disease.

Monitors 32 and 42 and the computer system 44 are mounted on a roll-around stand 50 with upright central standard 52, which allows the system to be moved to any location where it is needed, so that a single system can be shared between several patients and disciplines. Stand 50 has at least three, and preferably more, legs 54, each of which is fitted at or near the distal end thereof with a wheel 56 for rolling displacement of stand 50.

The patient monitor 32 is mounted on an articulated arm 34 which has a swivel mount allowing the monitor to be positioned over the patient and tilted at tilt joint 40 to any desired viewing angle. The arm 34 is supported by a vertically adjustable slide mounting system 36 which allows the entire arm 34 and monitor 30 assembly to be raised or lowered over a wide range of heights, as indicated by reference arrows R and L in FIG. 3.

The staff monitor display panel 42 is preferably an LCD monitor mounted on the general purpose computer 44. Preferably, the display panel 42 is affixed to housing 45 in a vertical orientation on the support pole or stand 52, opposite the patient monitor slide mounting system 36. The computer 44 and display panel 42 assembly is supported by an adjustable gas spring shock absorber device 60 which provides lift to allow the assembly to be easily positioned over a wide range of heights for optimum viewing and keyboard access. The shock absorber 60 also serves to prevent the computer and monitor subsystem from falling when released.

The resistive touch screen 32 functions in the same manner as a mouse type input device. By simply touching the screen 32 at the location representing the desired word button or menu item, the touch screen 32 senses the location of the contact and responds in the same manner as a typical point and click mouse input.

The software has been designed for ease of use with no prior computer experience or special training required. The displays on screen 32 and 42 feature large buttons with words or pictures on them which respond elicit responses by simply touching the screen image.

There are several, and preferably at least three, three basic screen displays:
(1) the Answer screen, (2) the Keyboard screen, and (3) the Q and A (question and answer) screen.

Figure 18:
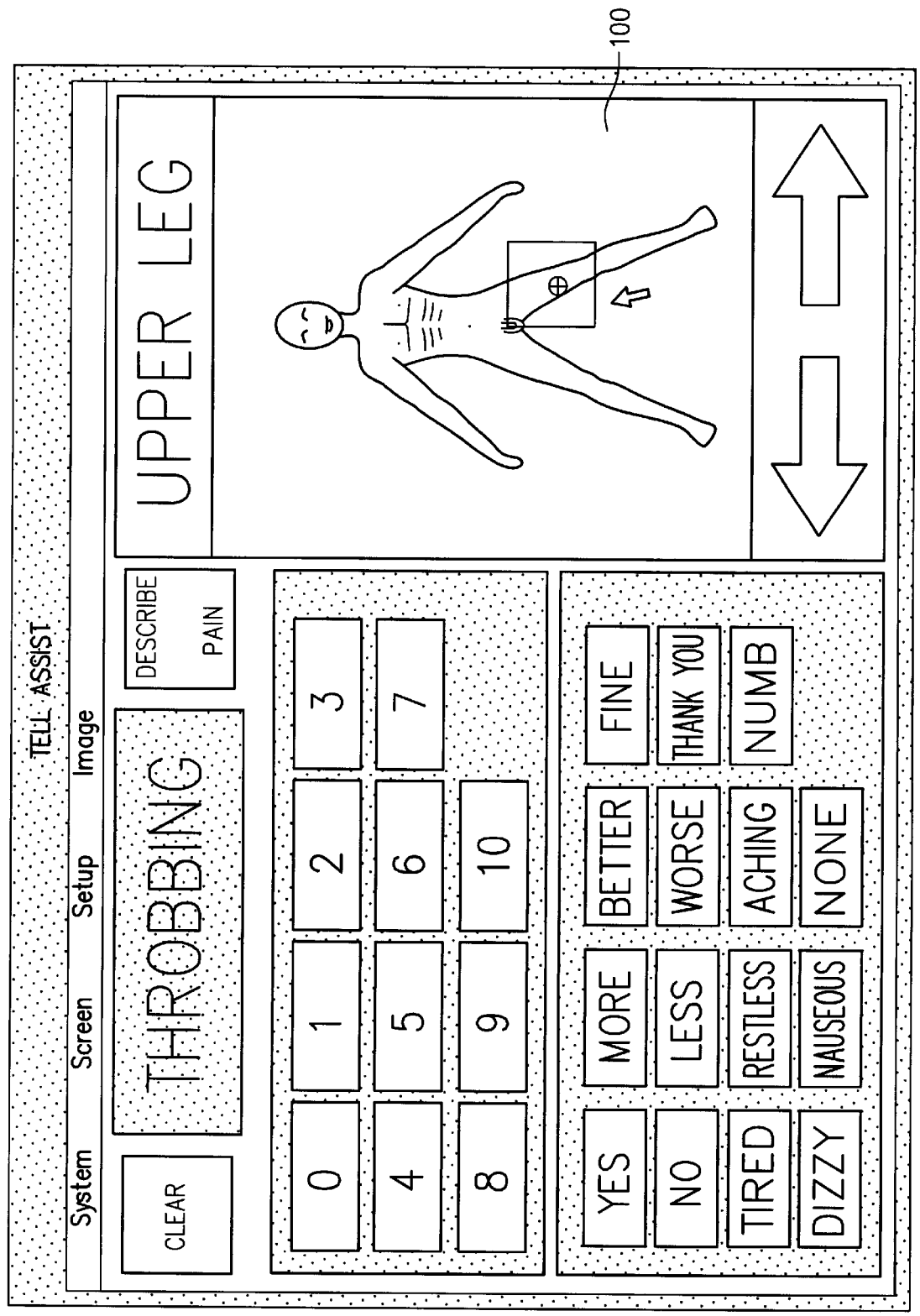
Figure 19:
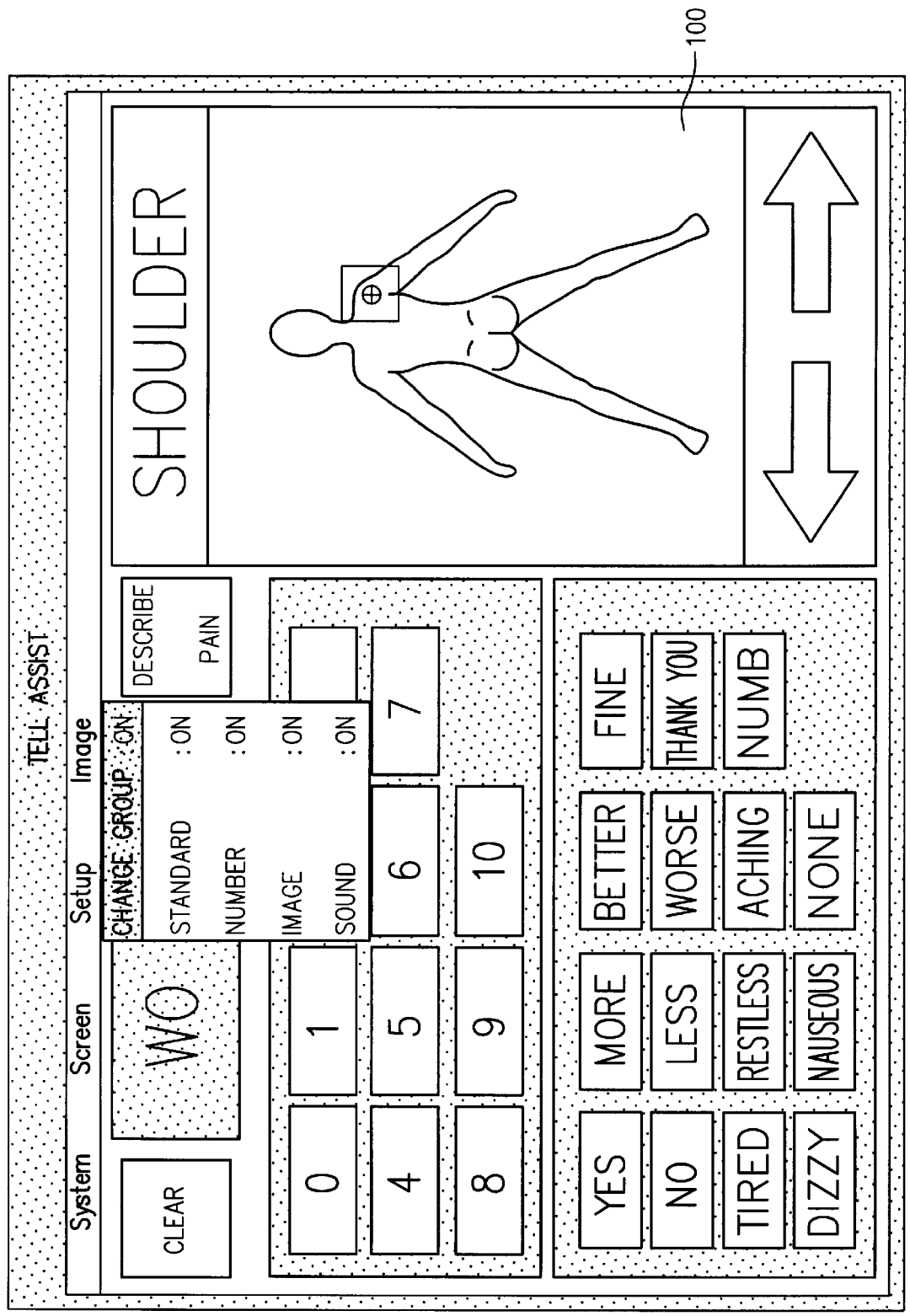
Figure 20:
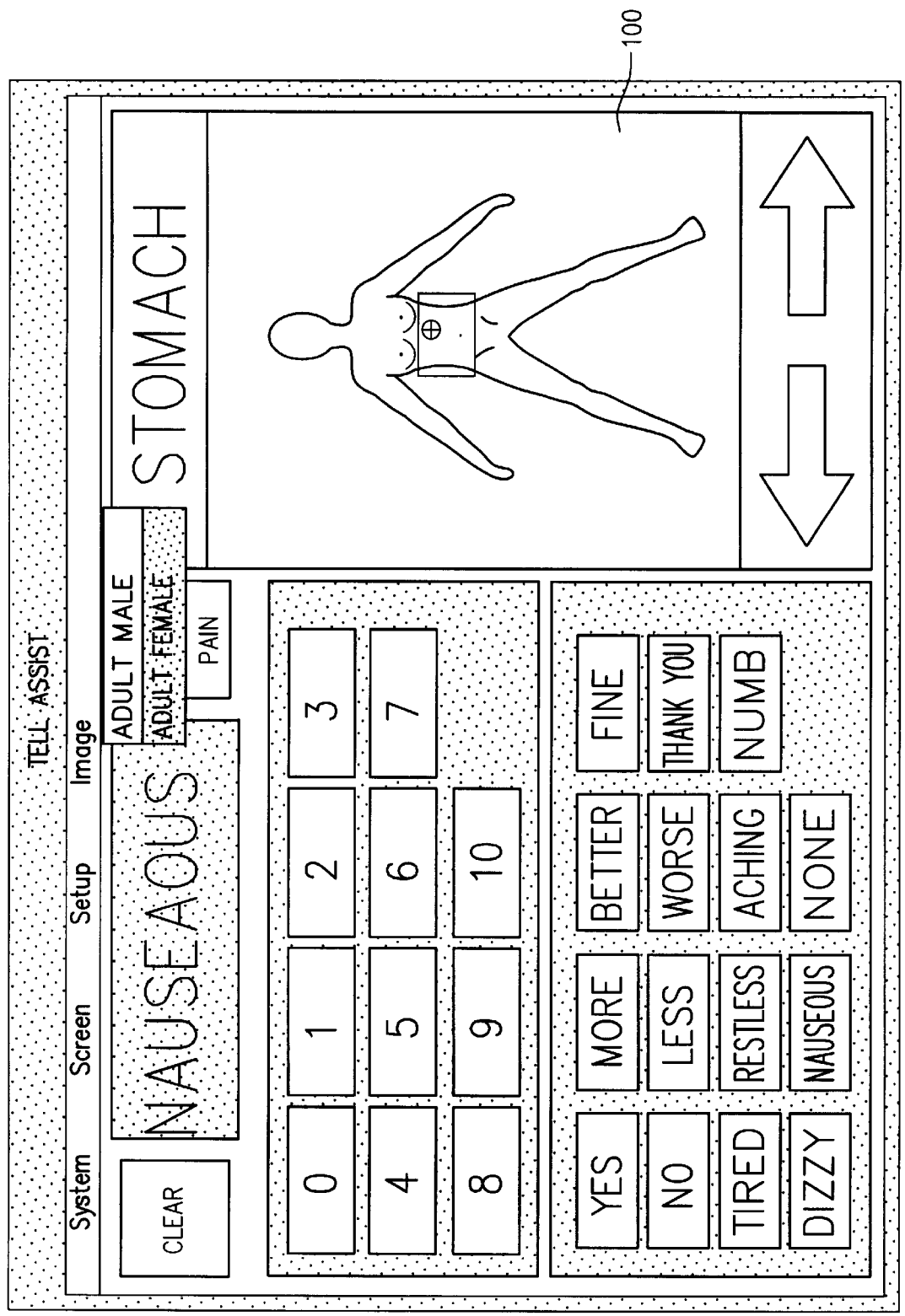
Figure 21:
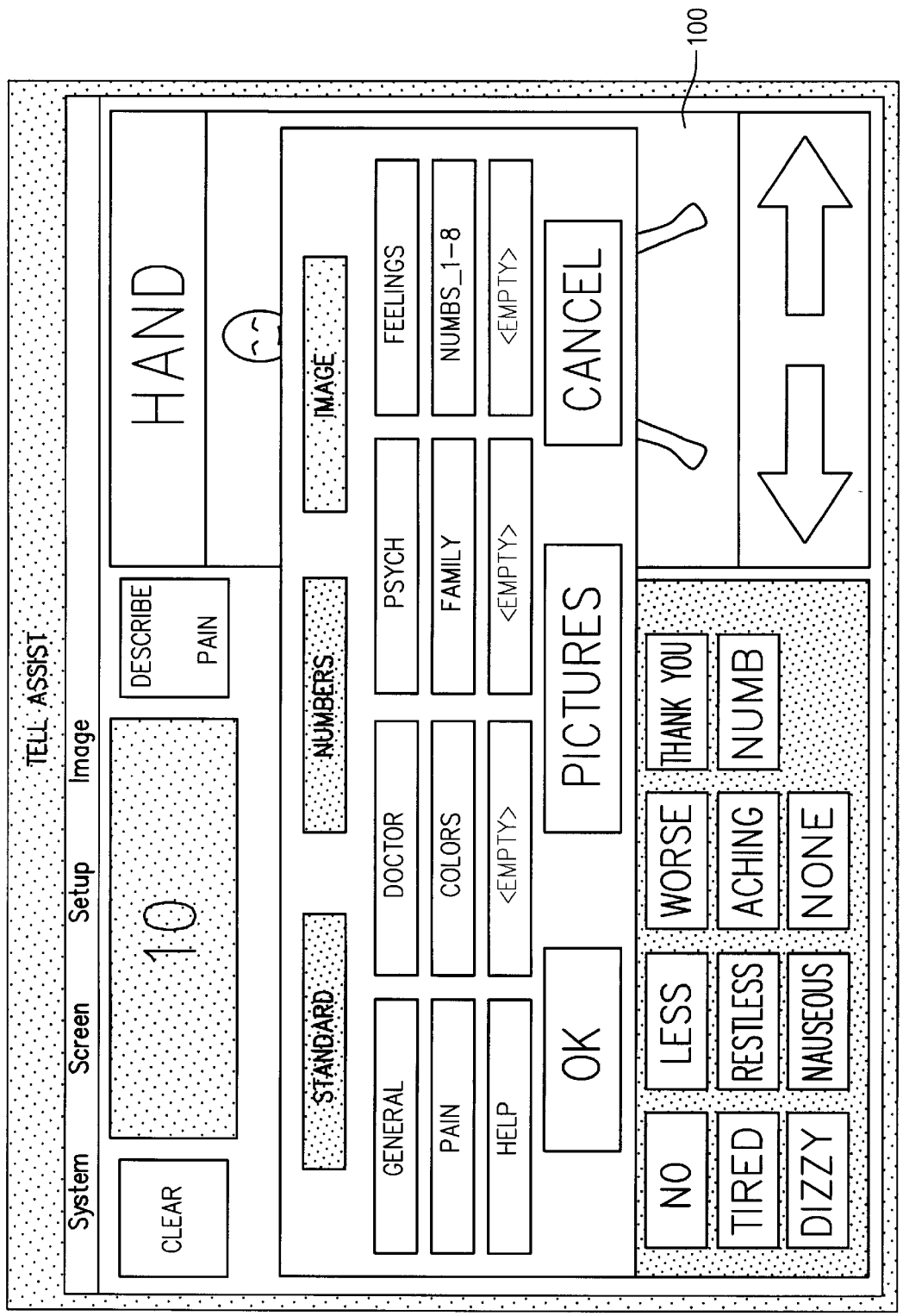

As seen, for example, in FIG. 18, the Answer screen has large answer buttons plus a graphic image of the human body which allows the patient to easily point out locations on their body in which they feel pain or discomfort. The system has a large vocabulary of words and phrases which can be selected for display to help focus on different staff disciplines, or simplify communication with family members.

Figure 7:
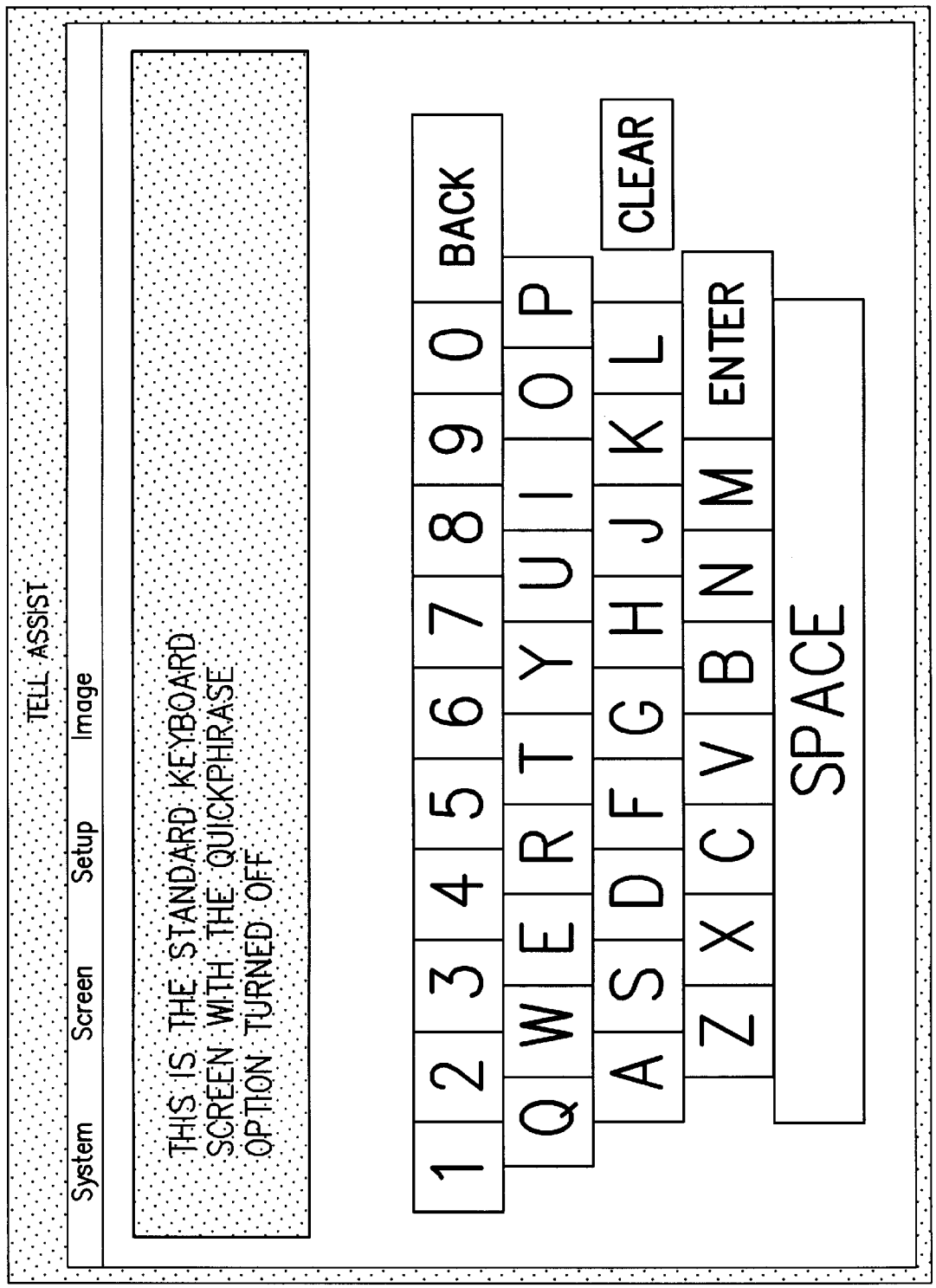
FIGS. 7 through 15 are printouts of graphical images shown on the patient display screen (and also on the care-giver's screen) when executing a particular function of the computer program, when short words are phrases are used as the primary method of communication.
Figure 8:
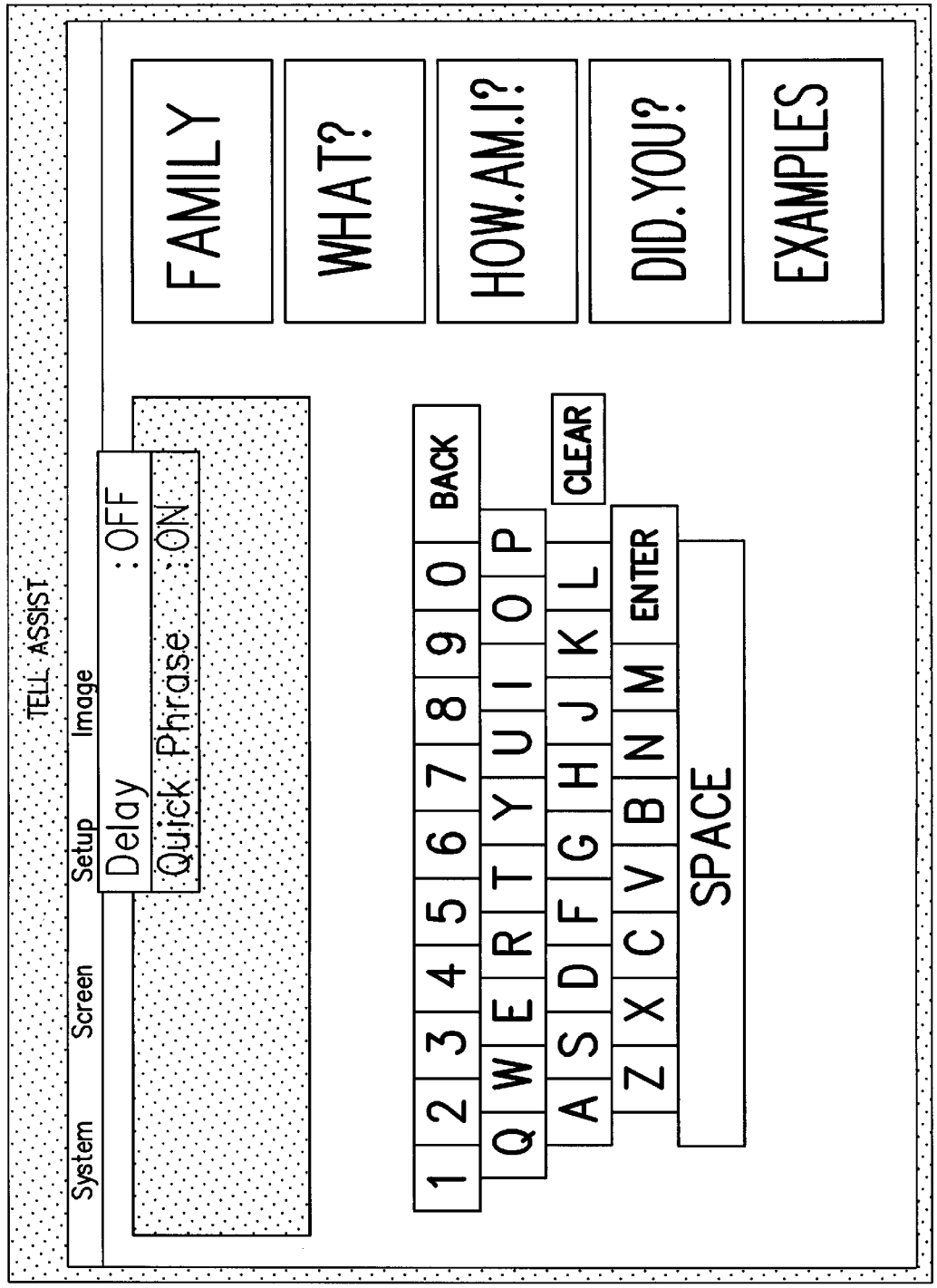
Figure 9:
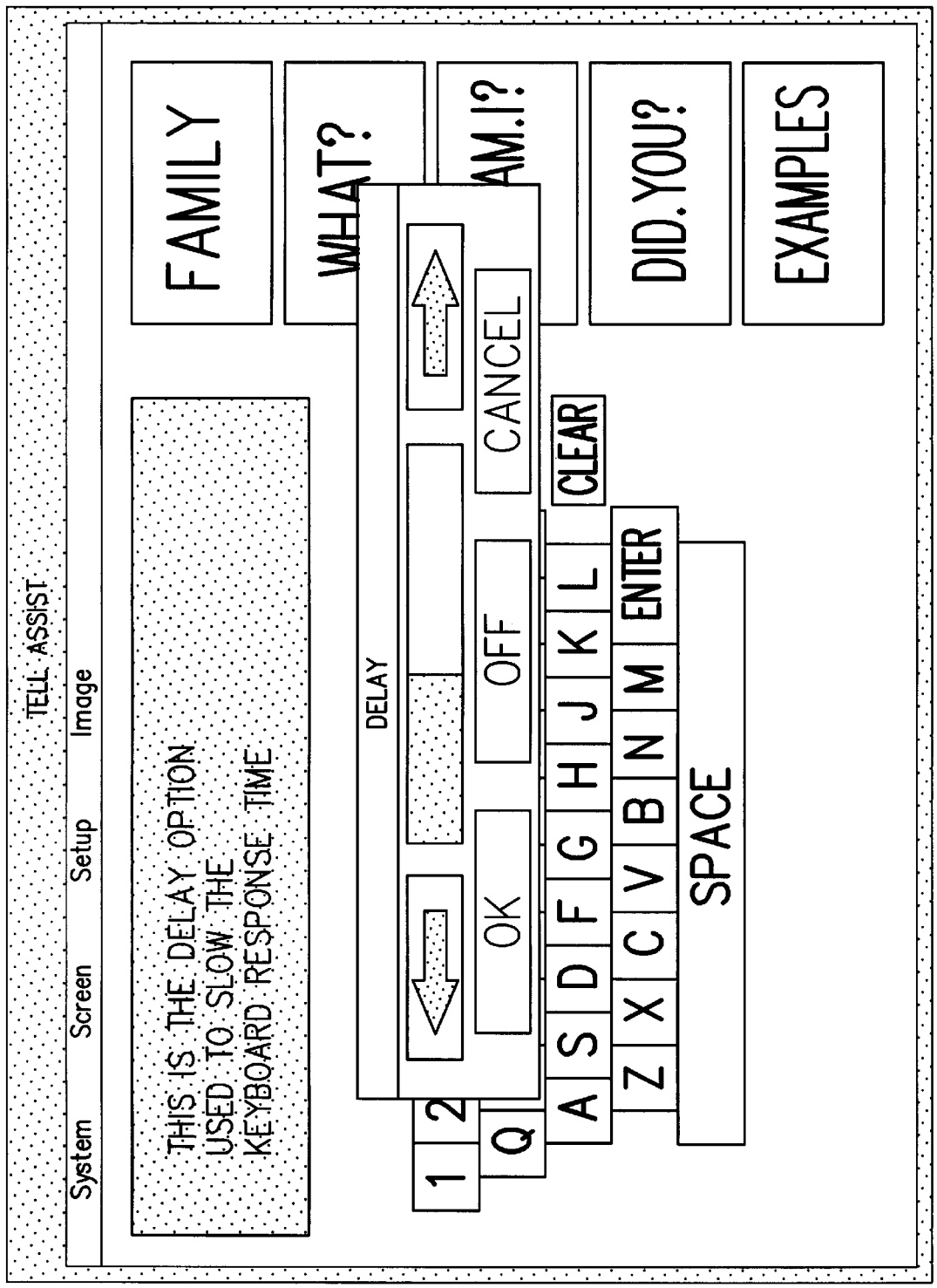

Reference is now made to FIG. 7, where a Keyboard screen is seen which provides the patient with the ability to type any desired message. In FIG. 8, the Keyboard screen is shown with the Quick Phrase option engaged, so the patient can select from a large list of common phrases to expand the level of communication as the patient returns to a higher level of mental and physical ability.

Figure 10:
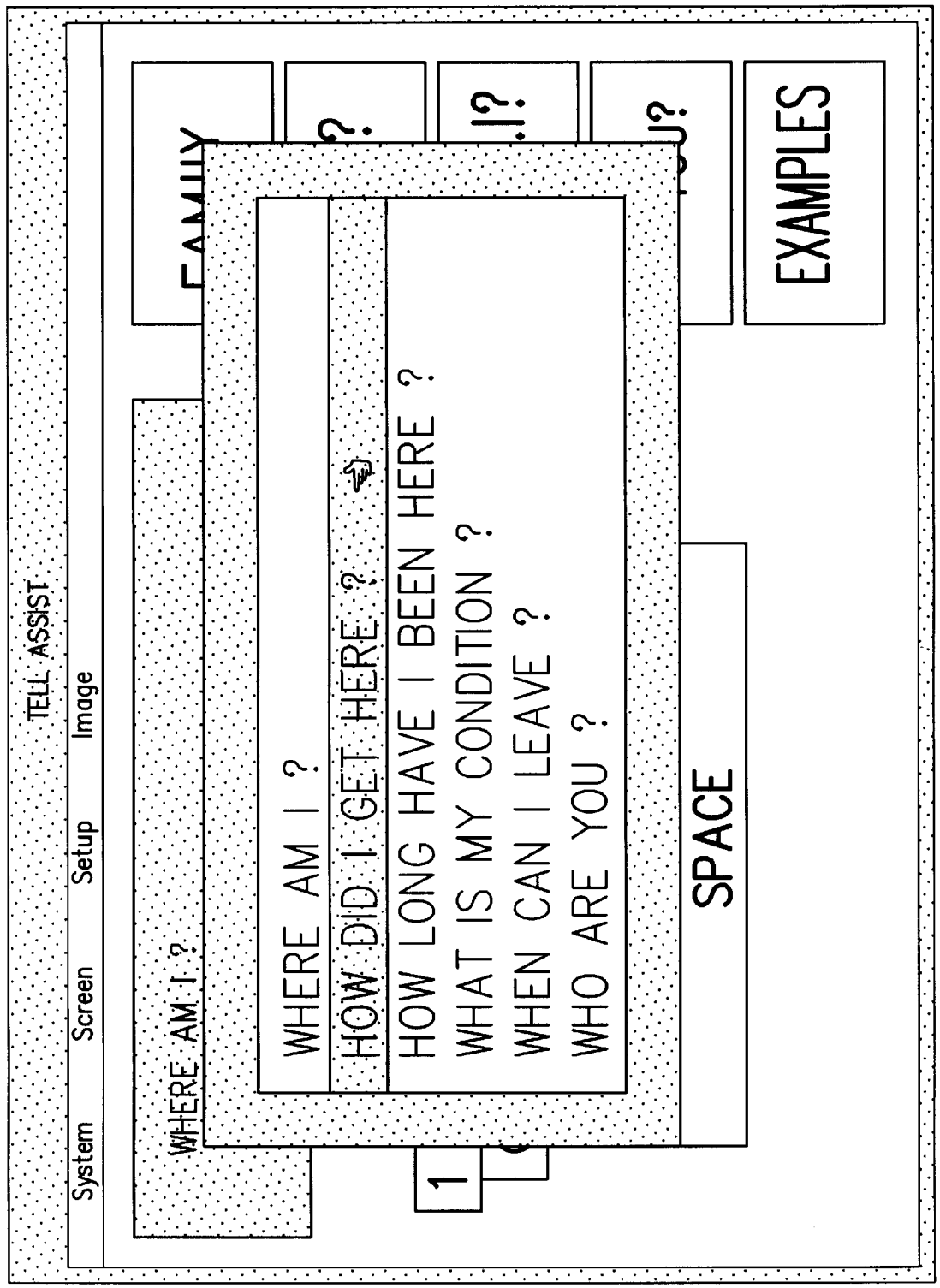
Figure 11:
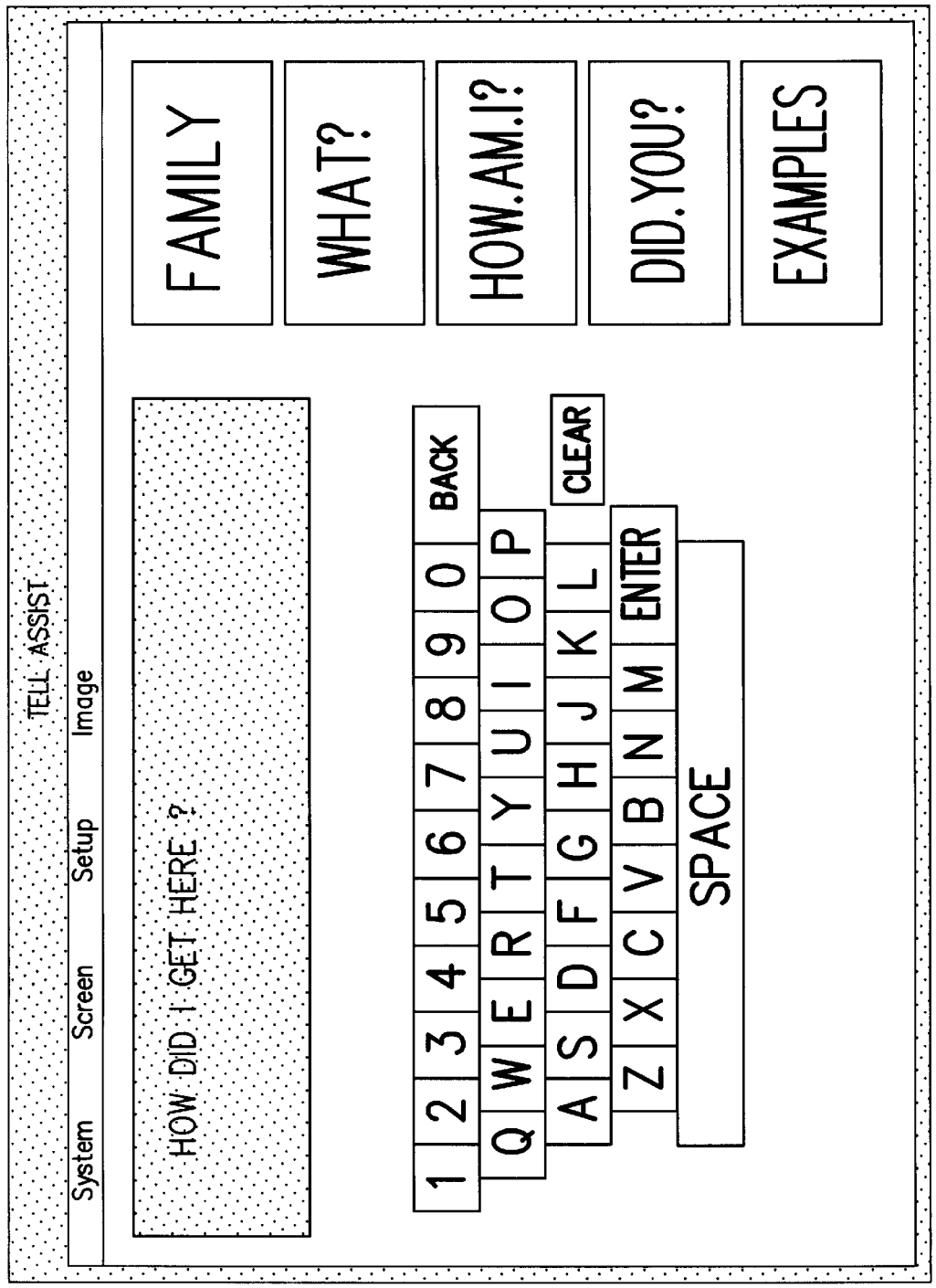
Figure 12:
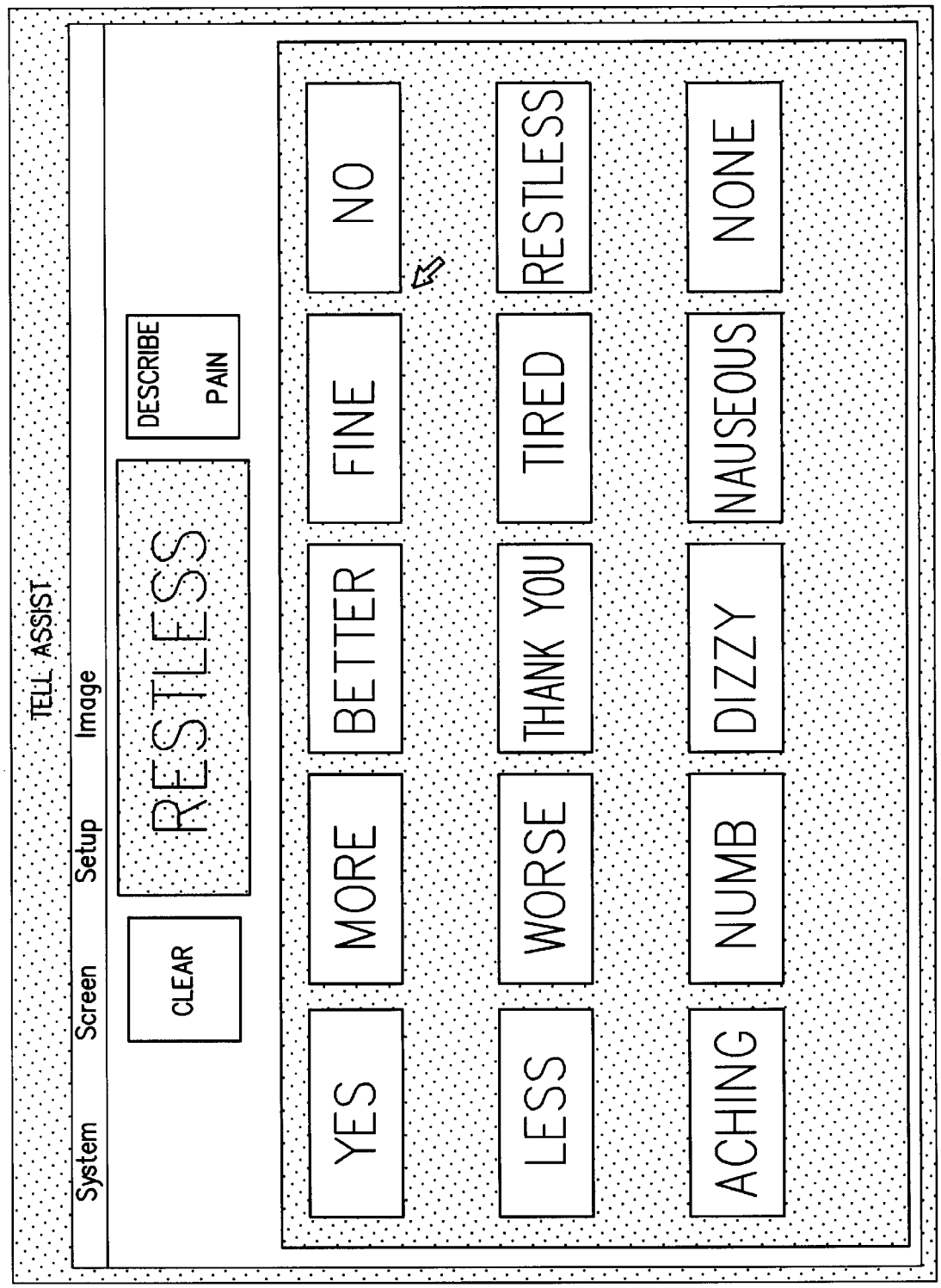
Figure 22:
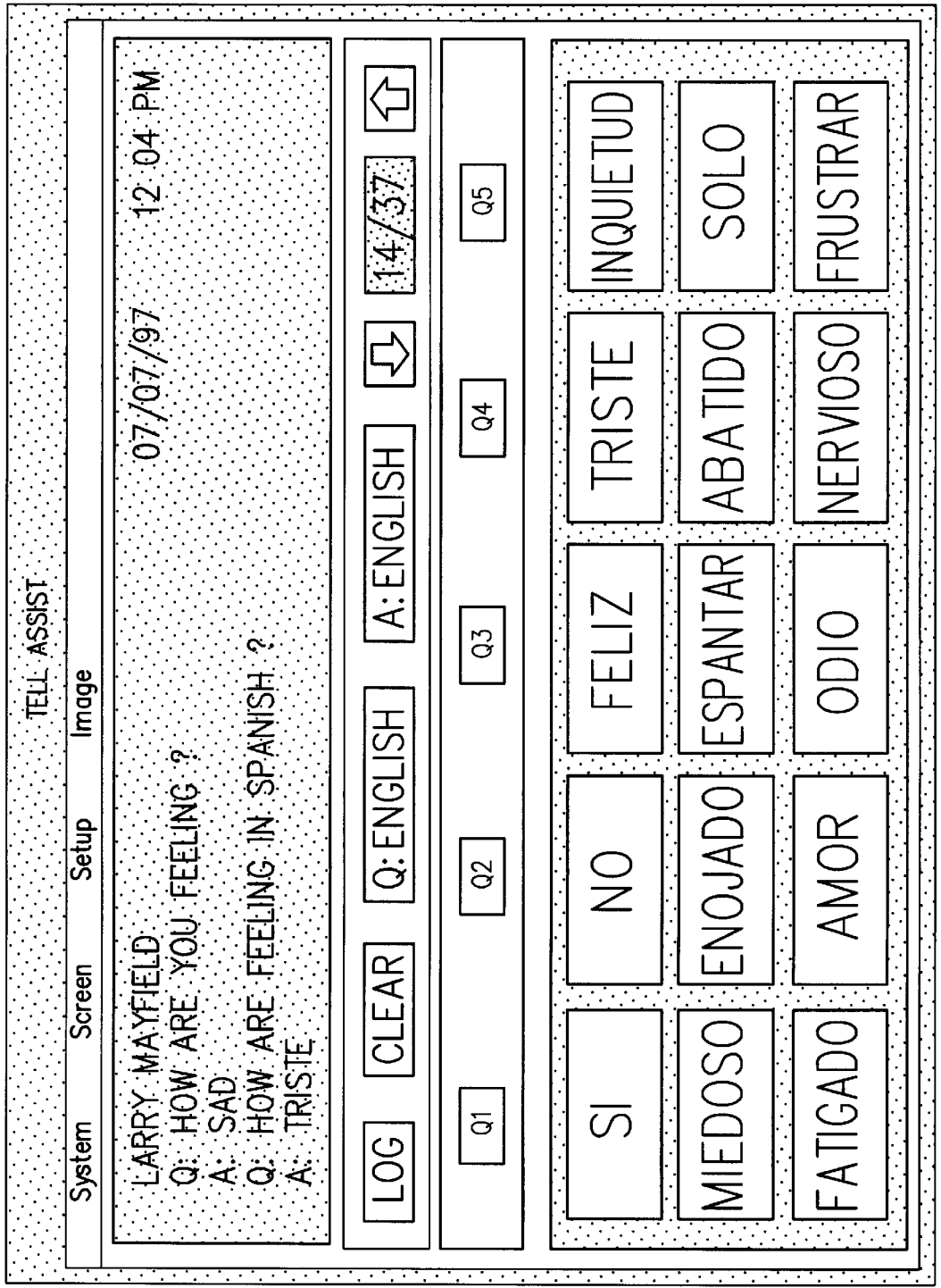
FIG. 22 shows a printout of a graphical image shown when questions are posed and answer choices provided in an English-Spanish language pair.
Figure 23:
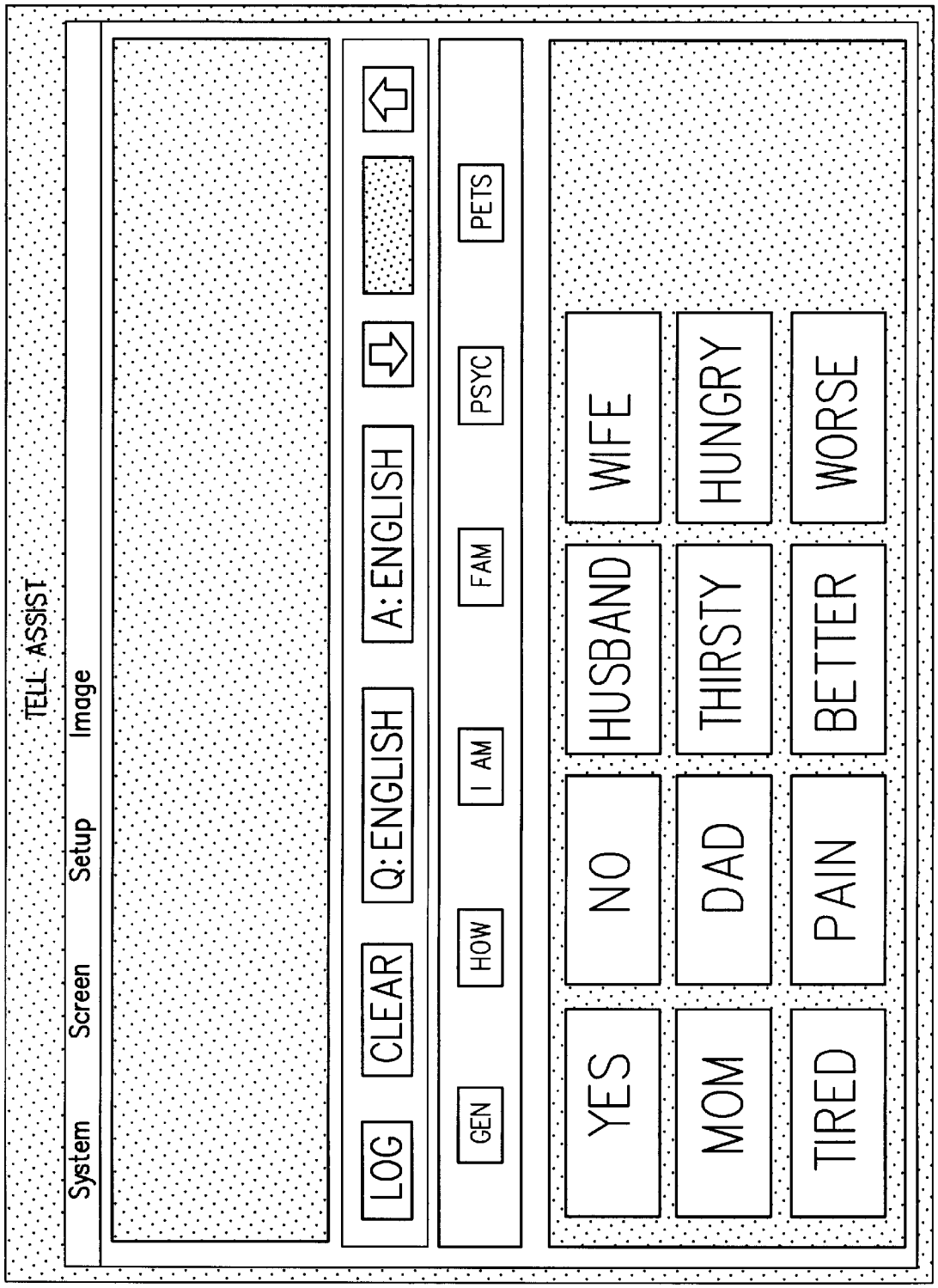
FIG. 23 shows one of the display screens when both questions are posed and answers are provided in the English language.
Figure 24:
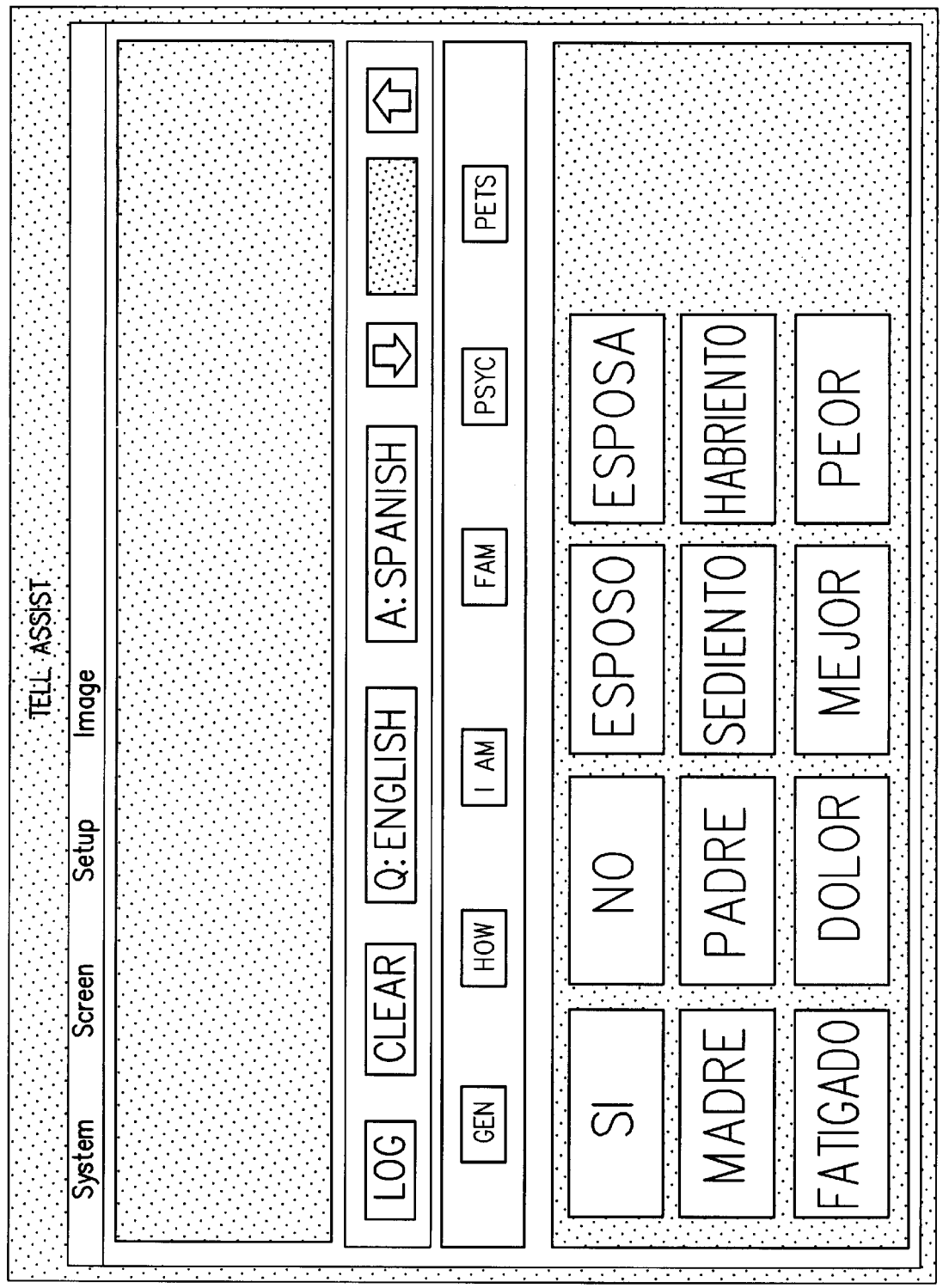
FIG. 24 shows one of the display screens when questions are posed in the English language, and answers are provided in the Spanish language.
Figure 25:
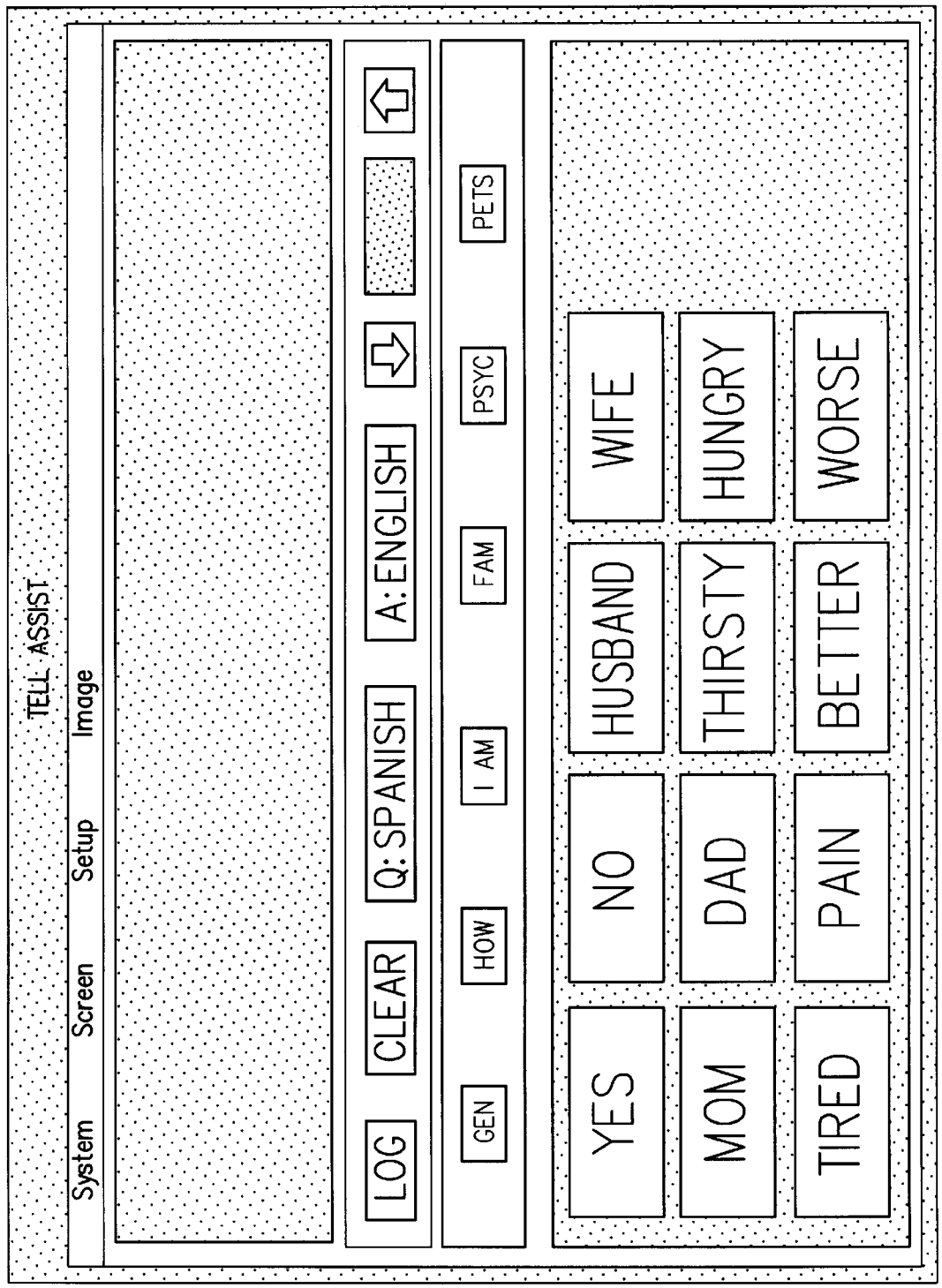
FIG. 25 shows one of the display screens when questions are posed in the Spanish language, and answers are provided in the English language.
Figure 26:
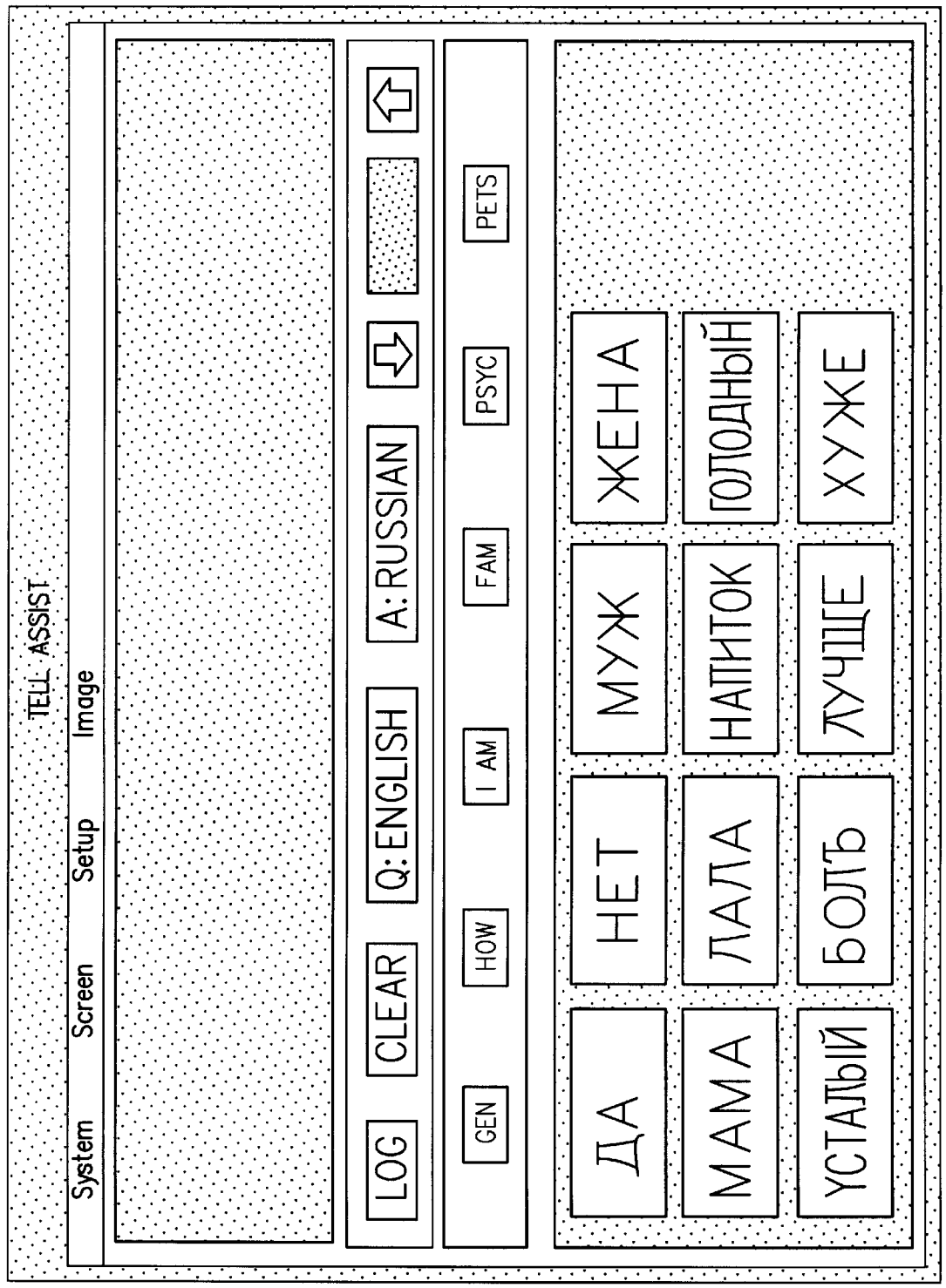
FIG. 26 shows one of the display screens when questions are posed in the English language, and answers are provided in the Russian language.

As seen in FIG. 10, the Question and Answer (Q and A) screen combines components of the other two screens. Additionally, a selected language pair may be chosen with the added ability to select between two different languages. Sees FIG. 22, for example. Lists of questions with corresponding answer buttons can be selected with selected questions and answers displayed in a text window in both languages, if the question and answer language is not the same.

In so far as we are aware, no other system has been designed specifically to facilitate communication with patients on respirators or mechanical ventilators with the features and ease of operation of the disclosed communication apparatus and method. Our unique design utilizes a touch screen and other input device options to allow the patient to take direct control of the system. The patient comes in physical contact with the system, and can control its operation with the touch screen or other mouse type point and click input devices.

Our communization system apparatus utilizes two thin profile LCD monitors facing opposite directions to allow the staff to view what the patient sees and observe the responses regardless of the position of the patient monitor. In the preferred embodiment, both monitors are driven by a single signal which is split and routed to the monitors.

An intuitively simple screen with answer buttons and other graphic images provides the primary interface with the patient. Patients answer questions by simply touching the button image on the screen displaying the desired word or menu item. Young children or non-English speaking patients can choose response buttons labeled with pictures depicting words such as "Doctor" or "Nurse" or "Drink" or other frequently used word.

A translation capability has been implemented with sets of questions and corresponding answers available in multiple languages. The question and response are displayed in both languages so that the patient and care giver can carry on a dialog in a selected language pair, such as English—Spanish, or English—Russian, or Spanish—Russian, as well as English—English, Spanish—Spanish, or Russian—Russian, or any other desired language pair.

Turning now to the hardware provided for implementing the method, one key element in our solution to developing an effective communications system, particularly for respirator patients, is the use of an LCD (liquid crystal display) technology in a sealed NEMA rated enclosure. This is important for several reasons. First, traditional CRT computer monitors are much too heavy and bulky to be positioned above the patient, as injuries might result from any displacement of the units. Moreover, CRTs are also a source of RF interference, and are not generally allowed in ICU units where sensitive medical electronics can be affected. It is therefore advantageous that LCD monitors are both light weight and thin profile, and operate on low DC voltage. The sealed enclosures can be cleaned and disinfected between patient use, and are available sealed to RF energy emissions, as well.

Screen size is also a critical issue, since the overall size determines how many objects images can be on the screen at one time. We have found that the smallest patient monitor size conveniently usable was a 12 inch screen with a 14 inch (diagonal) screen viewable size, and have found that patients prefer screens at least of that size, if not larger.

Also, although our method can be implemented with various input and pointing devices, we have found that for most patients, by far the most effective system involved the use of a resistive touch screen. Other, optional input devices which we have tested and used with our system include a standard mouse, a track ball style mouse device, and a touch pad style mouse device. All of the more traditional mouse type input devices required practice to coordinate, and were often too difficult to use by patients with limited dexterity. Other input devices including a "head mouse", which responds to head movement, and an input device that responds to eye movement are also candidates to assist patients with little or no ability to move their hands. These input devices are considerably more exotic and expensive, and are only required by a very small percentage of the patient population. However, it is to be understood that any input device which can replace a standard mouse point and click device could be used to control the system.

One desirable selection for the patient display screen is a resistive touch screen having a glass screen coated with a membrane that has a metallic grid which is sensitive to touch. The screen is mounted inside the enclosure of the LCD monitor, and responds to being touched exactly like a mouse point and click device. This feature of touch screens allows the software to be written to respond to a standard mouse device, but which can be used with both a mouse and a touch screen at the same time without further software modification. A touch pad is included in the preferred design for patient input. However, also provided is a standard keyboard as an input device for the staff, to allow them to make system selections.

The touch screen allows the patient to simply reach out and touch the screen with their finger or a other suitable pointing device to select a response to a question. This has proven to be a natural action for patients who have no experience with computers, and requires no practice or experience. A with most touch screens, a common pencil or other tool can also be used as a pointing device to extend the patients reach, and make it even easier to see where the screen is being touched.

For easy patient viewing, as is seen in FIG. 3, the patient monitor 30 support arm 34 must allow the monitor to be positioned at any location within handy reach of the patient, and allow the monitor to be tilted up or down for viewing. The solution chosen was an articulated arm 34 with rotating joint 62 at first end 64, and rotating joint 66 at second end 68, as well as at the elbow 35 junction. The monitor 30 attaches to the arm 34 on a swivel mount 40 which allows the monitor 30 to be tilted up or down approximately 30 degrees from level. The arm must extend to the center of a standard hospital bed, that size is typically eighteen inches from the side of the bed frame.

Our tests have indicated that patients can be expected to be at a wide range of elevations, ranging from wheelchair level to around 48 inches from the floor on adjustable beds. This corresponds to a range of monitor 30 elevations of approximately 25 inches to as much as 65 inches. A compromise range of adjustment height along a vertical axis, from approximately 35 inches to approximately 55 inches was chosen. That range was determined during patient tests, and seems adequate for the vast majority of situations. The mounting system chosen uses an extruded aluminum slide mount track 70 with a slide mounting attachment 72 for the articulated arm 34 assembly. The slide mounting attachment 72 can be positioned at any height within the length of the track by simply lifting up on the monitor 30 and raising or lowering the arm 34 manually. When released, the weight of the arm 34 and screen 30 assembly causes the slide mounting attachment 72 to wedge against the slide mount track 70 holding it in place. A simple sliding bar device serves as a locking mechanism to prevent accidental arm movement. While a 25 inch vertical track height was chosen for track 70, corresponding to a vertical adjustment range of 20 inches, the range can be extended by simply using a longer track 70 length.

For an operating platform, a general purpose computer 44 can be selected from standard multimedia PC architecture; presently Intel Pentium processor architecture would be preferred. Such general purpose computers are readily available in a wide variety of hardware configurations, and will be the host computer of choice in most applications. A multimedia PC also includes the support for video graphics and sound necessary for the this application, since, in particular, having sound available (so words are also heard, when selected, and do not simply appear on the display screen) is important. Also, a general purposed computer with support for CD ROM and other peripherals are likely to be desirable options, as our novel apparatus and method expands its functionality into related areas such as local area network (LAN) connections within the hospital.

The unusual requirement for a mobile design, and the desire that the size of the system be kept as small as possible, lead to the selection of a thin profile PC system. We prefer the use of a system produced by Datalux Corporation of Winchester, Virginia (which equipment can be seen on the Datalux web page at "http://www.datalux.com"). Datalux offers a Pentium PC packaged in a very small assembly under the brand name DataBrick II, which is housed in a chassis along with a small keyboard that can be closed and locked. In addition, Datalux produces 10 and 12 inch LCD monitors in NEMA rated enclosures which can be mounted along with the computer system 44 on a roll-around stand 50. The computer 44 and staff monitor 42 is supported by a gas spring shock absorber device 60 that provides lift and allows the assembly to be positioned over an extended vertical range. Other manufacturers offer NEMA rated touch screen monitors in sizes up to 16 inches which can be used as alternates to the Datalux monitors if larger screen 42 sizes are desired. The NEMA rating is important since such equipment must be cleanable between uses with different patients.

Figure 2:
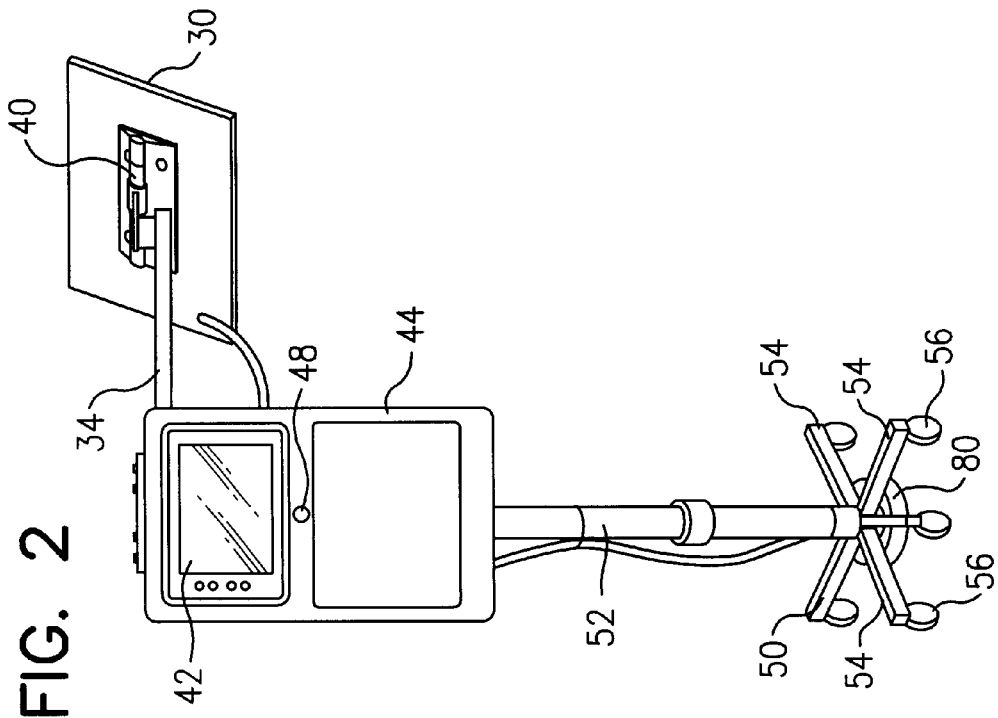
FIG. 2 is another perspective view of the apparatus used for implementing our system of communication with a patient, showing a relocatable mounting stand on rollers, a general purpose computer with the storable keyboard in the stowed, closed position, and a patient screen on an articulating arm in the extended position, with the screen tilted down toward a patient.

As seen in FIGS. 1 and 2, a battery pack 80 with removable battery modules 81 is attached to the base of the vertical pole 52 to provide power to the computer 44 and to both of the display screen systems. Preferably, the battery pack 80 is always included, to allow the communications system to be used when an AC power outlet is not available, or when it is desirable to operate the system without the power cord stretched across the floor. The inclusion of the battery pack 80 also adds ballast which makes the system more stable. If the battery pack in not included, ballast weights (not shown, but placed in lieu of battery pack 80) are added underneath the stand 50 to provide stability. Ideally, however, the entire apparatus is run with DC power, and the batter pack is simply being re-charged when AC power is available.

Optional configurations include a cabinet style stand using a standard desk configuration PC and CRT monitor for use in nursing homes or other lower intensity environments. The method and computer program can also be implemented in a stationary hardware configuration with the patient monitor mounting system attached to a wall or to the bed itself.

For software design, our apparatus and method uses as its primary engine a software application providing a simple graphical user interface (GUI) which allows a patient to quickly and easily ask questions about their condition, inform the hospital staff of pain or discomfort and where it is being felt, and construct simple sentences to carry on conversations and answer questions from staff and family. The basic flow sheet for one method of implementing the software is set forth in Appendix A. However, since as discussed elsewhere, various programming languages can be utilized to implement the methods taught herein, it is not necessary to spell out the exact code utilized to carry out the method, as once the flow sheets and the key elements are understood, it should be possible for any experienced programmer to readily implement the method taught herein.

Figure 13:
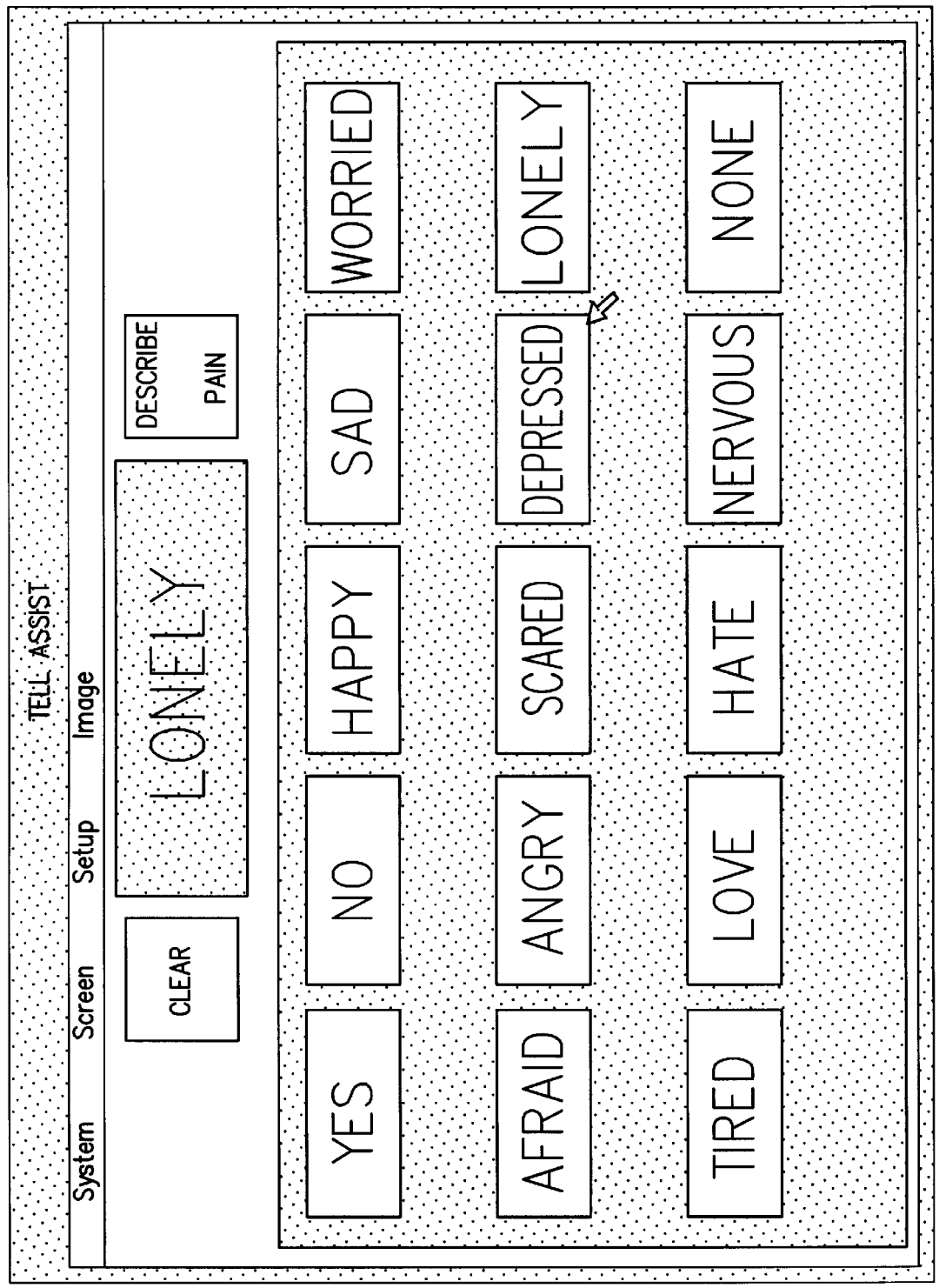
Figure 14:
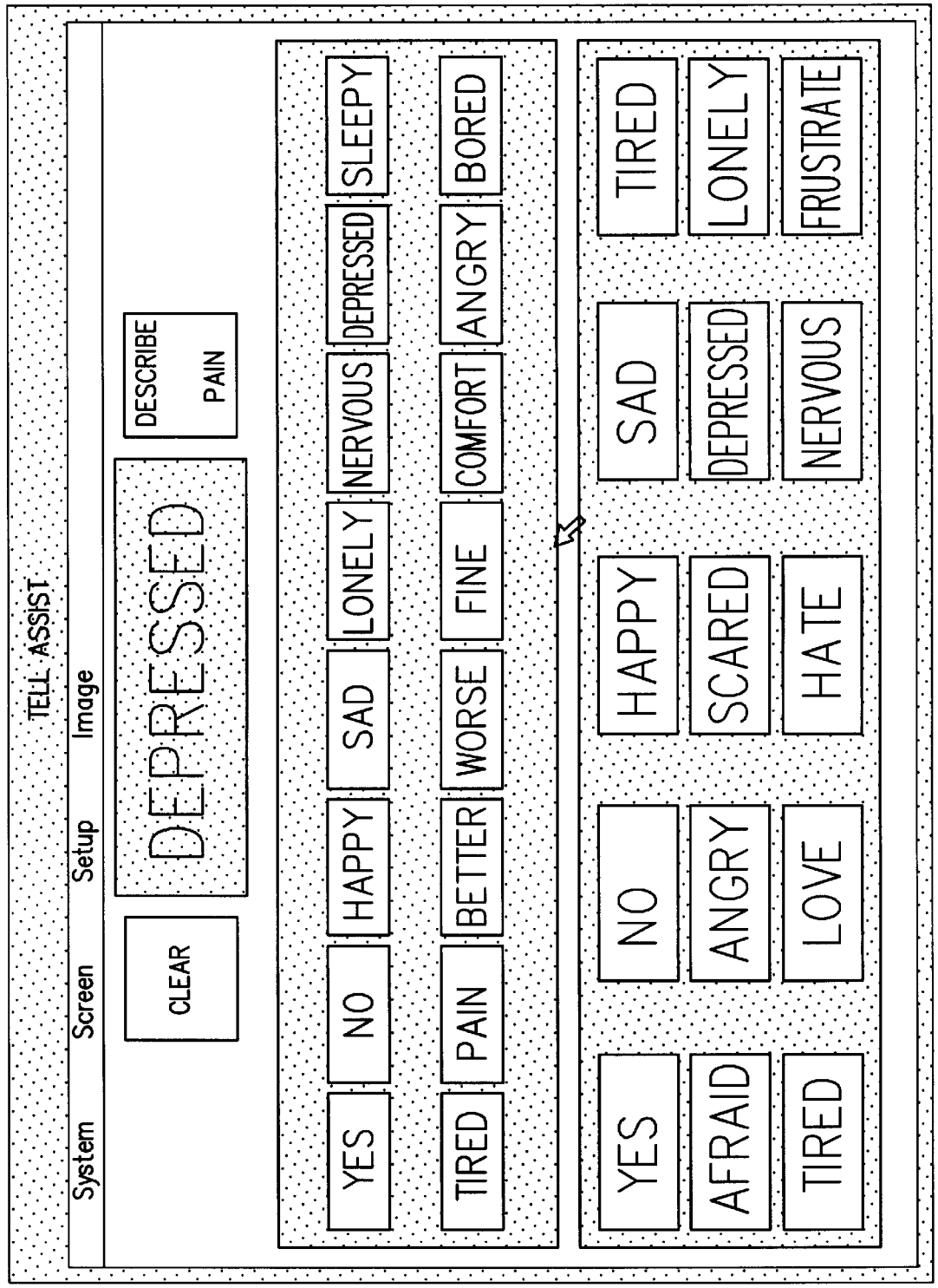
Figure 15:
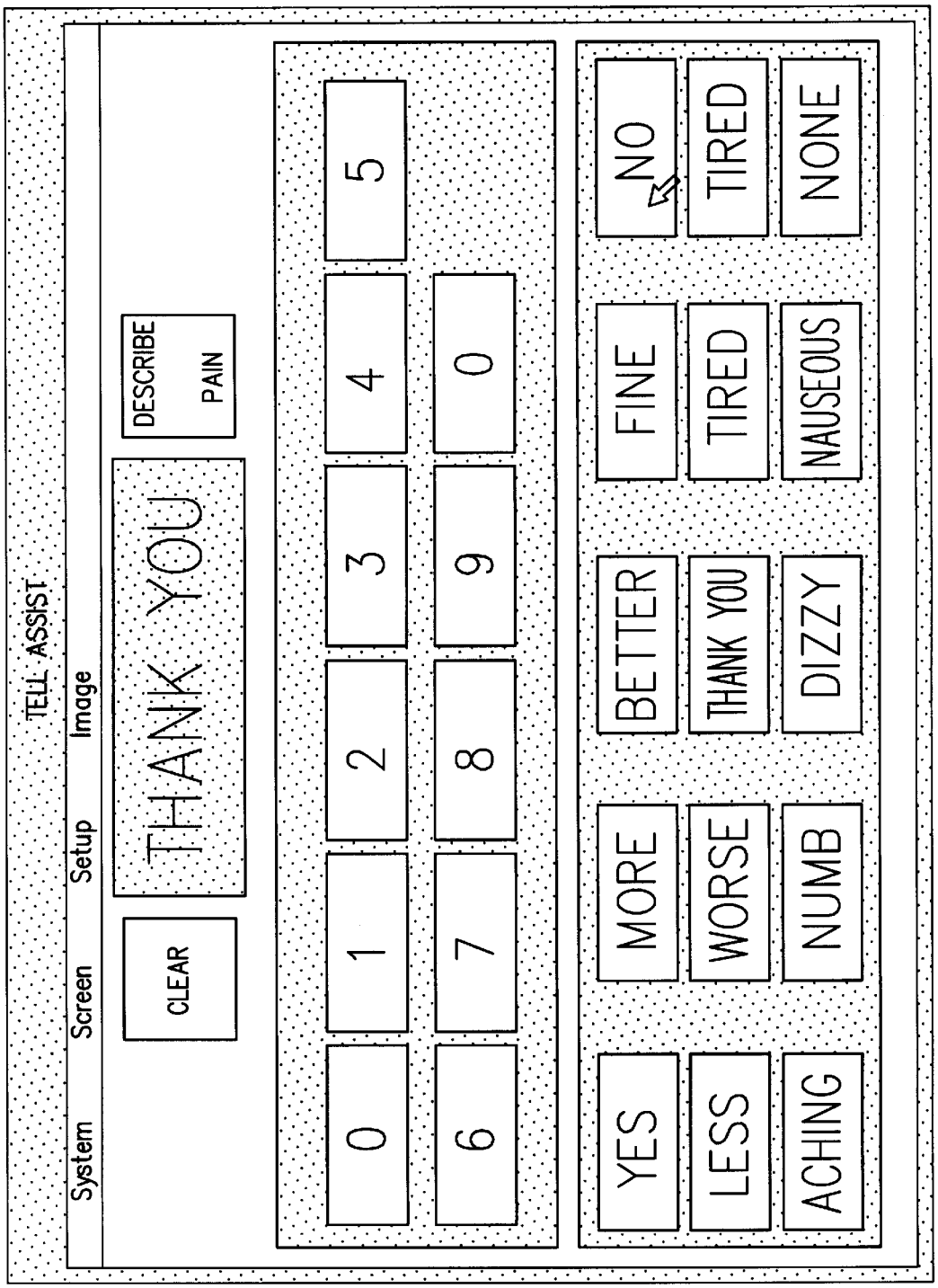
Figure 16:
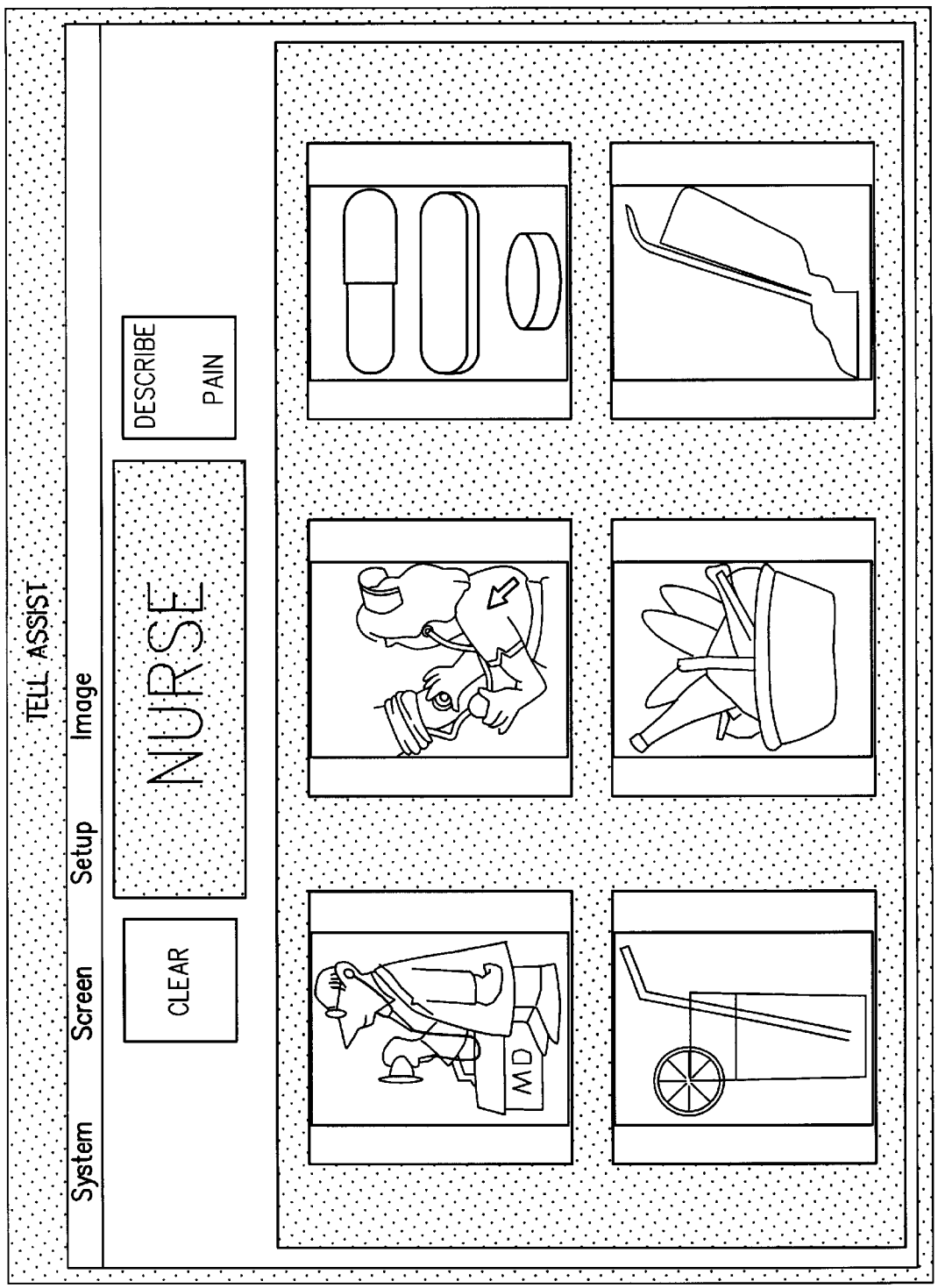
FIG. 16 is a printout of a graphical image shown on the patient display screen (and also on the care-giver's screen) when schematic diagrams are used to convey messages, rather than words.
Figure 17:
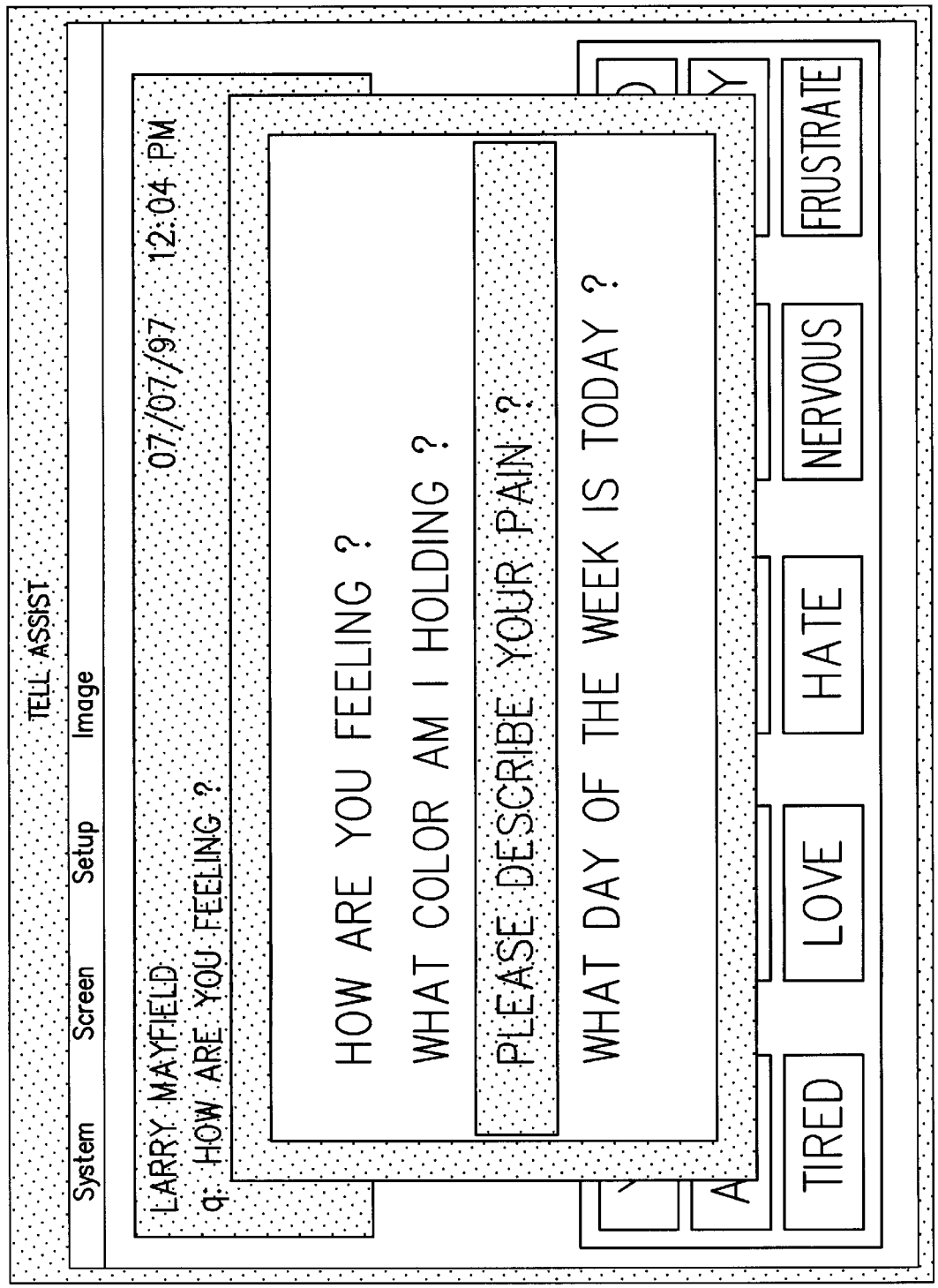
FIGS. 17 through 21 are printouts of graphical images shown when the computer program is directed to the pain description area, and show, at FIGS. 18 through 20, an image of a human body available for directing a pointer in order to identify an area of pain, as well as the ability to select descriptions of such pain, for example in FIG. 18.

Special attention has been given to designing the interface for ease of use and simplicity. The fundamental assumption is that the target patient has no prior knowledge of computers, and has been severely incapacitated by medical trauma or medication. System use is preferably achieved by the simple and natural action of pointing to the desired object on the screen in front of the patient. The primary patient interface is through the touch screen integral to the LCD monitor. Patients simply touch labeled buttons and images on the screen in front of them to select the desired response to questions, or construct messages on the screen. The system optionally responds with an audible voice stating the selected answer, as well as displaying it on both the patient and staff monitor displays. Where desirable, the method also can be implemented via use of several pictures depicting simple concepts, such as a glass of water representing thirst, to facilitate communication for example, with small children, as is seen in FIG. 13.

In one embodiment, the software has been written in C/C++ which offers flexibility and control with a small amount of nonessential overhead. The resulting executable program can be run in DOS 6.22 or later, and any current version of Windows including Windows NT. While C/C++ and DOS were the languages and operating system of choice for the first implementation, the basic functionality of the software can also be implemented in other languages such as Visual Basic, and operating systems such as the MacIntosh or Unix based platforms, as desired. Since the exact program listing will vary depending on the chosen language, the important concept is to provide for an interactive software program which allows questions to be selected and displayed, and for appropriate answers to be selected., as taught herein. However, a brief outline of the program functionality is set forth in Appendix B.

In one embodiment, the graphical user interface (GUI) screens includes (1) an Answer screen, (2) a Keyboard screen, and (3) a Q&A (question and answer) screen. Each of these screens has several optional settings which can be selected from pull down menus accessible from topics listed in a row along the top of the screen. To select any response button or menu item, it is only necessary to touch the patient monitor, or to point and click with the system's mouse or touch pad input device.

The system displays the Answer screen after completing the power up and initialization sequences. The Answer screen has four areas which contain variable sets of answer buttons and images depending on the options selected. The Keyboard screen includes a standard keyboard beside a column of labeled buttons which access lists of phrases called QuickPhrases. The Q and A screen provides lists of questions accessible by buttons which have corresponding answer button sets. The question and answer sets have been provided in multiple languages with can be selected to facilitate a simple translation operation.

Preferably, the default settings at power up include a large window near the top center of the screen which displays the responses selected, two selectable button group windows, and a window with an image of the human body. The response window at the top is preferably always displayed, regardless of which other features are selected or de-selected.

The human body image window is provided to particularly allow the patient to indicate the location of pain. Touching any point on the image marks the exact location and displays the general location in text and voice. For example, touching the thigh region places a cross hair image over the point touched, and displays the word "Upper Leg" in the message box while saying the words. Image options include a male or female adult image with front and back views to allow patients to better specify locations of discomfort.

The "Word list" which operates as a default answer button group set is displayed in the lower group window on the screen, and preferably contains the most frequently used words including YES, NO, and TIRED. Although "Word lists" can be developed in any desired number, we have found it preferable to have at least 10, and possible as many as 25 or more. In this manner, a wide variety of words are available and a desired set can be selected for working in specific situations. Some desirable word lists are set forth in Table I.

TABLE I

WORD LISTS

| List 1 - General | List 2 - Doctor | List 3 - Nurse |
|---|---|---|
| Yes | Yes | Yes |
| No | No | No |
| Doctor | Better | Thirsty |
| Nurse | Worse | Hungry |
| Family | Fine | Bed Pan |
| Pain | Pain | Tired |
| Tired | Tired | Drugs |
| Thirsty | Dizzy | Suction |
| Hungry | Nauseous | Bath |
| Bed Pan | Drugs | Family |
| Drugs | Nurse | TV |

| List 4 - Psychologist | List 5 - Days of Week | List 6 - Months |
|---|---|---|
| Yes | Monday | January |
| No | Tuesday | February |
| Happy | Wednesday | March |
| Sad | Thursday | April |
| Lonely | Friday | May |
| Afraid | Saturday | June |
| Bored | Sunday | July |
| Love | Week | August |
| Hate | Month | September |
|  | Year | October |
|  |  | November |
|  |  | December |

| List 7 - Family | List 8 - Describe Pain | List 9 - Body |
|---|---|---|
| Wife | Stabbing | Head |
| Husband | Sharp | Neck |
| Father | Shooting | Chest |
| Mother | Tingling | Stomach |
| Son | Pounding | Hand |
| Daughter | Dull | Upper Arm |
| Brother | Constant | Lower Arm |
| Sister | Burning | Upper Leg |
| Grandpa | Itching | Lower Leg |
| Grandma | Bad Pain | Upper Body |
|  | Sore Throat | Lower Body |

| List 10 - Colors | List 11 - Miscellaneous |
|---|---|
| Red | Sleepy |
| Black | Comfort |
| White | Dog |
| Green | Cat |
| Blue | Food |
| Yellow | More |
| Orange | Light |
| Gray | Hot |
| Purple | Juice |
| Brown | Time |
|  | Help |

Numbers are normally provided, preferably a set of number buttons from 0 to 10 displayed in the center window on the screen. These buttons allow the patient to indicate "on a scale of 1 to 10" just how intense the pain is at the present time. This is a typical method used by doctors to distinguish levels of pain, and quantify changes in the intensity over time which helps determine how effective the treatment has been. See FIGS. 18 or 27, for example.

Button groups can be changed by selecting the pull down Setup menu, and selecting any one of a pre-selected set of designated groups. Utilities help the staff create or edit the groups to define a set of buttons which is most effective for their discipline, or of personal preference to the individual care giver.

The image window 100 (which shows the front or back of a human male or female, as selected by the user) can be turned off using the setup menu to expand the two button group windows thereby enlarging the size of the button windows, and expanding the size of the message buttons. This is an effective method of focusing on particular text groups, or compensating for patients with particularly poor eyesight. The buttons can be further expanded by turning off one of the button groups leaving the remaining group to fill the entire screen.

The keyboard screen is one of the options which can be chosen by the operator of our apparatus. By selecting the screen option from the topics at the top of the display, the operator to can choose between the Answer Screen, the Keyboard Screen, and the Q and A screen. Choosing the Keyboard screen changes the display to a standard keyboard button screen with a text window at the top, and a set of QuickPhrase buttons along the right side of the screen. The keyboard can be used to type any message onto the text screen window at the top of the display. Selecting one of the QuickPhrase buttons brings up a list of commonly used questions and phrases which can be selected for display on the text screen by touching the phrase twice.

Phrases from the various QuickPhrase buttons can be mixed with text entered from the keyboard letter buttons to form sentences to quickly communicate with staff and family. Selected phrase groups which appear when the "Quick Phrase" buttons are set forth in Table 2.

TABLE 2

Select Phrase Group 1

Where is my wife?
Where is my husband?
Where are my children?
Where is my mother?
Where is my father?
Where is my son?
Where is my daughter?
Select Phrase Group 2

I need my nurse.
I cannot breath.
I am choking.
I am thirsty.
I am in pain.
I want my bed pan.
Select Phrase Group 3

Did you find my pet?
Did you find my dog?
Did you find my cat?
Select Phrase Group 4

Did you find the insurance?
Did you pay the bills?
Did you make the deposit?
Did you call the family?
Did you find my pet?
Did you find the key?
Select Phrase Group 5

Where am I?
How did I get here?
When can I leave?
Who are you?

The Setup menu option can also be used to turn the QuickPhrase button set Off thereby expanding the standard keyboard to the full screen width. This has the effect of increasing the key size making it easier to type individual letters.

The Q and A (question and answer) screen combines many of the key components of the Answer screen and the Keyboard screen while adding the capability to choose between different languages for either the questions or corresponding answers. The Q and A screen has a large text display window at the top similar to the text display in the Keyboard screen. This text window displays the patients name along with the date and time of the question to serve as an identifier for logging purposes allowing for review of dialogs with several patients and time periods. The text window displays all of the selected questions and corresponding answers to them in all selected languages.

There are several control buttons which allow selection of the question and answer languages, whether to log the last exchange to disk, and which of the available question sets is desired for the next dialog. There are also Up and Down Arrows which serve to step through previously logged exchanges allowing the operator to view sequences of questions, or to view questions from a particular patient, date, or time period.

The lower half of the Q and A screen is reserved to display answer buttons in the same fashion as the buttons on the Answer screen. In this case, however, the answers are grouped in combinations which are the most typical answers to the corresponding question set. For example, the question "What Day of the Week Is It" would cause the system to respond by displaying a set of buttons with the days of the week for the patient to select from. The question "What Color Am I Holding" would bring up a set of buttons with colors in text form.

The language feature allows the operator to specify different languages for the questions and answer. If two languages are chosen, each question and answer selection will be displayed in the text window in both of the languages. This serves as a simplified translator whereby care givers can carry on a dialog with patients who do not speak English, or can communicate directly in one of the available languages without being forced to translate into English.

While the Q and A screen is an extension of the functionality required to communicate with speech impaired individuals, it is equally effective in use as a simple translator for the non-English speaking patients, as well.

Performance Testing

Testing was initiated at a regional hospital used by many local hospitals for their long term respirator patients. Doctors participating in tests included a licensed nurse-psychologist, and speech and physical therapists. The average stay at the facility is 60 days, thus it offered a wide range of patient conditions and situations to test and evaluate the effectiveness our unique apparatus and method. Response to the experimental prototype test unit in the limited test area was immediate and extremely positive. Each of the doctors and therapists who were allowed to use the system agreed that our novel apparatus and method for communication with a patient would improve their ability to help their patients. For the first test, a patient was chosen who had been on a ventilator for eight weeks. Within two minutes of turning on the prototype system for him, he was using it to communicate with his nurse. It was natural for him to reach out and touch the screen to answer questions, tell his nurse that he was in pain, where it hurt and how much, and to use the keyboard screen to request medication. He repeatedly indicated that "this was a great idea".

Also, during the first day of testing, the system was utilized to perform a psychological evaluation of three patients who had been unresponsive for an extended period of time, and were considered to be functioning at very low mental level. In only a few minutes with each patient, the psychologist was able to determine from patient responses that the patients were actually very alert and functioning at a very high mental level, but were physically unable or unwilling to respond. The ability to better evaluate such patients by use of the novel apparatus and method described herein has changed the treatment program for such patients. The caregivers agreed that our novel apparatus and method was the only device currently available that could have allowed them to correctly evaluate the selected patients.

It will thus be seen that the objects set forth above, including those made apparent from the preceding description, are efficiently attained, and, since certain changes may be made in carrying out the construction of an apparatus and in providing a computer program for carrying out the method of communicating with a language or speech deficient patient, it is to be understood that our invention may be embodied in other specific forms without departing from the spirit or essential characteristics thereof, and many other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

The intention is to cover all modifications, equivalents, and alternatives falling within the scope and spirit of the claims as expressed herein. As such, the invention is intended to cover the structures, apparatus, and methods described herein, and not only the equivalents or structural equivalents thereof, but also equivalent structures or methods. Thus, the scope of the invention, as described, is intended to include variations from the embodiments provided, which are nevertheless described by the broad meaning and range properly afforded to the language of the terms included herein, or the equivalents thereof.

We claim:

1. An apparatus for facilitating communication between a patient and a second individual, said apparatus comprising:
   (a) a stand;
   (b) a general purpose computer mounted on said stand, said general purpose computer further comprising
      (i) a software program for facilitating communication between said patient and said second individual, and
      (ii) a first display screen adapted for viewing by said second individual;
   (c) an arm, said arm comprising a distal end and a proximal end, said proximal end mounted to said stand;
   (d) a second display screen, said second display screen adjustably mounted at the distal end of said arm, said second display screen further comprising a tilting adjustment mechanism so that said patient can view said second display screen, and;
   (e) a pointing device acceptor adapted for receiving input from said patient, so as to operate said software program; and
   (f) interconnecting cable operatively connecting said general purpose computer and said second display screen.

2. The apparatus as set forth in claim 1, wherein said arm is articulating.

3. The apparatus set forth in claim 2, wherein said articulating arm further comprises, at the distal end thereof, a tilt joint mount.

4. The apparatus as set forth in claim 1, wherein said articulating arm is displaceable along a vertical axis.

5. The apparatus as set forth in claim 1, wherein said articulating arm is displaceable along a first horizontal axis.

6. The apparatus as set forth in claim 1, wherein said articulating arm is displaceable along a second horizontal axis.

7. The apparatus as set forth in claim 1, wherein said stand is portable.

8. The apparatus as set forth in claim 7, wherein said portable stand further comprises at least three support feet.

9. The apparatus as set forth in claim 8, wherein each of said at least three support feet further comprises a wheel, and wherein said portable stand is adapted for rolling from a first location to a second location.

10. The apparatus as set forth in claim 1, wherein said general purpose computer further comprises an input keyboard.

11. The apparatus as set forth in claim 10, wherein said input keyboard comprises a membrane type, water tight, cleanable keyboard.

12. The apparatus as set forth in claim 1, wherein said first display panel is a touch type interactive display panel.

13. The apparatus as set forth in claim 1, wherein said second display panel is a touch type interactive display panel.

14. The apparatus as set forth in claim 12, wherein said touch type panel is water tight.

15. The apparatus as set forth in claim 13, wherein said touch type panel is water tight.

16. A method of communicating between a patient and a second individual, said method comprising:
   (a) providing a general purpose computer;
   (b) providing a first screen for visual display of images to said patient;
   (c) providing a second screen for visual display images to said second individual;
   (d) generating a primary set of images, said primary set of images corresponding to at least one set of images selected from a number N of sets of questions relating to care of said patient;
   (e) displaying said primary set of images on said first screen or on said second screen;
   (f) displaying a secondary set of images, said secondary set of images corresponding to at least one set of answers responsive to said primary set of images;
   (g) allowing said patient or said second individual to select from said at least one set of answers a single answer by interacting with said secondary set of images with a pointing device;
   (h) displaying said single answer on said second screen.

17. The method as set forth in claim 16, wherein said primary set of images and said secondary set of images are in the same language.

18. The method as set forth in claim 16, wherein said primary set of images and said secondary set of images are in different languages.

19. The method as set forth in claim 16, further comprising, in said primary set of images and in said secondary set of images, an image of a human body.

20. The method as set forth in claim 19, wherein said image of a human body is male.

21. The method as set forth in claim 19, wherein said image of a human body is female.

22. The method as set forth in claim 16, wherein said primary set of images and said secondary set of images comprises a set of words selected from a pre-selected word list.

23. The method as set forth in claim 16, wherein said primary set of images and said secondary set of images comprises a set of phrases selected from a pre-selected phrase list.

24. The method as set forth in claim 16, wherein said primary set of images and said secondary set of images comprises a set of numbers from 1 to 10.

25. The method as set forth in claim 22, further including the step of providing an aural rendition of a word selected from said pre-selected word list, when said word is selected by said patient.

26. The method as set forth in claim 18, wherein said different languages comprise English and Spanish.

27. The method as set forth in claim 18, wherein said different languages comprise English and Russian.

\* \* \* \* \*